(12) United States Patent
Sakai et al.

(10) Patent No.: US 11,740,773 B2
(45) Date of Patent: Aug. 29, 2023

(54) INFORMATION PROCESSING DEVICE AND METHOD

(71) Applicant: SONY GROUP CORPORATION, Tokyo (JP)

(72) Inventors: Yusuke Sakai, Tokyo (JP); Kiichi Kobayashi, Hokkaido (JP); Yosuke Seki, Hokkaido (JP); Kazutaka Ishizaki, Hokkaido (JP); Akira Tsutsumi, Hokkaido (JP); Ayako Tsushima, Hokkaido (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/755,096

(22) PCT Filed: Oct. 23, 2020

(86) PCT No.: PCT/JP2020/039847
§ 371 (c)(1),
(2) Date: Apr. 21, 2022

(87) PCT Pub. No.: WO2021/085320
PCT Pub. Date: May 6, 2021

(65) Prior Publication Data
US 2022/0374117 A1 Nov. 24, 2022

(30) Foreign Application Priority Data
Oct. 31, 2019 (JP) .................................. 2019-198780

(51) Int. Cl.
*H04N 21/431* (2011.01)
*G06F 3/0484* (2022.01)
*G06F 3/0481* (2022.01)

(52) U.S. Cl.
CPC .......... *G06F 3/0484* (2013.01); *G06F 3/0481* (2013.01); *H04N 21/431* (2013.01)

(58) Field of Classification Search
CPC .... G06F 3/0484; G06F 3/0481; H04N 21/431
See application file for complete search history.

(56) References Cited

U.S. PATENT DOCUMENTS

| 2010/0049702 A1 | 2/2010 | Martinez et al. |
| 2013/0238727 A1 | 9/2013 | Martinez et al. |

(Continued)

FOREIGN PATENT DOCUMENTS

| CN | 102187362 A | 9/2011 |
| EP | 2329450 A2 | 6/2011 |

(Continued)

OTHER PUBLICATIONS

Vikas Kumar et al., Physical Telepresence: Growth trends of Tangible User Interface and its future, Oct. 1, 2016, IEEE Xplore, pp. 229-235 (Year: 2016).*

(Continued)

*Primary Examiner* — Tam T Tran
(74) *Attorney, Agent, or Firm* — Chip Law Group

(57) ABSTRACT

The present disclosure relates to an information processing device and a method capable of implementing more various communications.
In a space of a user, an input of information by the user is accepted, and tag information for associating control information for controlling occurrence of an event for a communication partner of the user with a space of the communication partner is generated using the accepted information. Furthermore, it is determined whether or not an occurrence condition of the event designated by the tag information for associating the control information for controlling the occurrence of the event for the communication partner with the (Continued)

space of the communication partner, the tag information associated with the space of the user is satisfied, and in a case where it is determined that the occurrence condition is satisfied, the event designated by the tag information is allowed to occur. The present disclosure may be applied to, for example, an information processing device, an image processing device, an electronic device, an information processing method, a program or the like.

20 Claims, 17 Drawing Sheets

(56) References Cited

U.S. PATENT DOCUMENTS

| | | | |
|---|---|---|---|
| 2014/0330928 A1* | 11/2014 | Takehara | H04L 65/4015 709/217 |
| 2014/0347262 A1* | 11/2014 | Paek | G06F 3/147 345/156 |
| 2017/0235975 A1* | 8/2017 | Iwanami | G06F 21/64 726/28 |
| 2020/0012819 A1 | 1/2020 | Iwanami et al. | |

FOREIGN PATENT DOCUMENTS

| | | |
|---|---|---|
| JP | 2002-300602 A | 10/2002 |
| JP | 2003-244670 A | 8/2003 |
| JP | 2004-056161 A | 2/2004 |
| KR | 10-2011-0069019 A | 6/2011 |
| WO | 2010/021833 A2 | 2/2010 |
| WO | 2016/072118 A1 | 5/2016 |

OTHER PUBLICATIONS

Van Kha Ly Ha et al., Real-Time Video Streaming with Multi-Camera for a Telepresence Wheelchair, Nov. 1, 2016, IEEE Xplore, pp. 1-4 (Year: 2016).*

International Search Report and Written Opinion of PCT Application No. PCT/JP2020/039847, dated Jan. 12, 2021, 09 pages of ISRWO.

* cited by examiner

INFORMATION PROCESSING DEVICE AND METHOD

CROSS REFERENCE TO RELATED APPLICATIONS

This application is a U.S. National Phase of International Patent Application No PCT/JP2020/039847 filed on Oct. 23, 2020, which claims priority benefit of Japanese Patent Application No. JP 2019-198780 filed in the Japan Patent Office on Oct. 31, 2019. Each of the above-referenced applications is hereby incorporated herein by reference in its entirety.

TECHNICAL FIELD

The present disclosure relates to an information processing device and a method, and especially relates to an information processing device and a method capable of implementing more various communications.

BACKGROUND ART

A telepresence system has been conventionally conceived for users located in remote places from each other to communicate with each other (for example, refer to Patent Document 1).

CITATION LIST

Patent Document

Patent Document 1: Japanese Patent Application Laid-Open No. 2002-300602

SUMMARY OF THE INVENTION

Problems to be Solved by the Invention

However, in the conventional telepresence system, only images and voices have been transferred to each other, and only real-time communication might be performed. Therefore, more various communication methods have been required.

The present disclosure is achieved in view of such a situation and an object thereof is to implement more various communications.

Solutions to Problems

An information processing device according to an aspect of the present technology is an information processing device provided with an input unit that accepts, in a space of a user, an input of information by the user, and a generation unit that generates tag information for associating control information for controlling occurrence of an event for a communication partner of the user with a space of the communication partner using the information accepted by the input unit.

An information processing method according to an aspect of the present technology is an information processing method provided with accepting, in a space of a user, an input of information by the user, and generating tag information for associating control information for controlling occurrence of an event for a communication partner of the user with a space of the communication partner using the accepted information.

An information processing device according to another aspect of the present technology is an information processing device provided with a determination unit that determines whether or not an occurrence condition of an event designated by tag information for associating control information for controlling occurrence of the event for a communication partner with a space of the communication partner, the tag information associated with a space of a user is satisfied, and an event occurrence unit that allows, in a case where it is determined that the occurrence condition is satisfied by the determination unit, the event designated by the tag information to occur.

An information processing method according to another aspect of the present technology is an information processing method provided with determining whether or not an occurrence condition of an event designated by tag information for associating control information for controlling occurrence of the event for a communication partner with a space of the communication partner, the tag information associated with a space of a user is satisfied, and generating the event designated by the tag information in a case where it is determined that the occurrence condition is satisfied.

In the information processing device and the method according to an aspect of the present technology, in the space of the user, the input of the information by the user is accepted, and the tag information for associating the control information for controlling the occurrence of the event for the communication partner of the user with the space of the communication partner is generated using the accepted information.

In the information processing device and the method according to another aspect of the present technology, it is determined whether or not the occurrence condition of the event designated by the tag information for associating the control information for controlling the occurrence of the event for the communication partner with the space of the communication partner, the tag information associated with the space of the user is satisfied, and in a case where it is determined that the occurrence condition is satisfied, the event designated by the tag information is allowed to occur.

MODE FOR CARRYING OUT THE INVENTION

Modes for carrying out the present disclosure (hereinafter, referred to as embodiments) are hereinafter described. Note that, the description is given in the following order.
1. First Embodiment (Telepresence System)
2. Second Embodiment (Other Examples)
3. Appendix 1. First Embodiment <Telepresence System>

Figure 1:
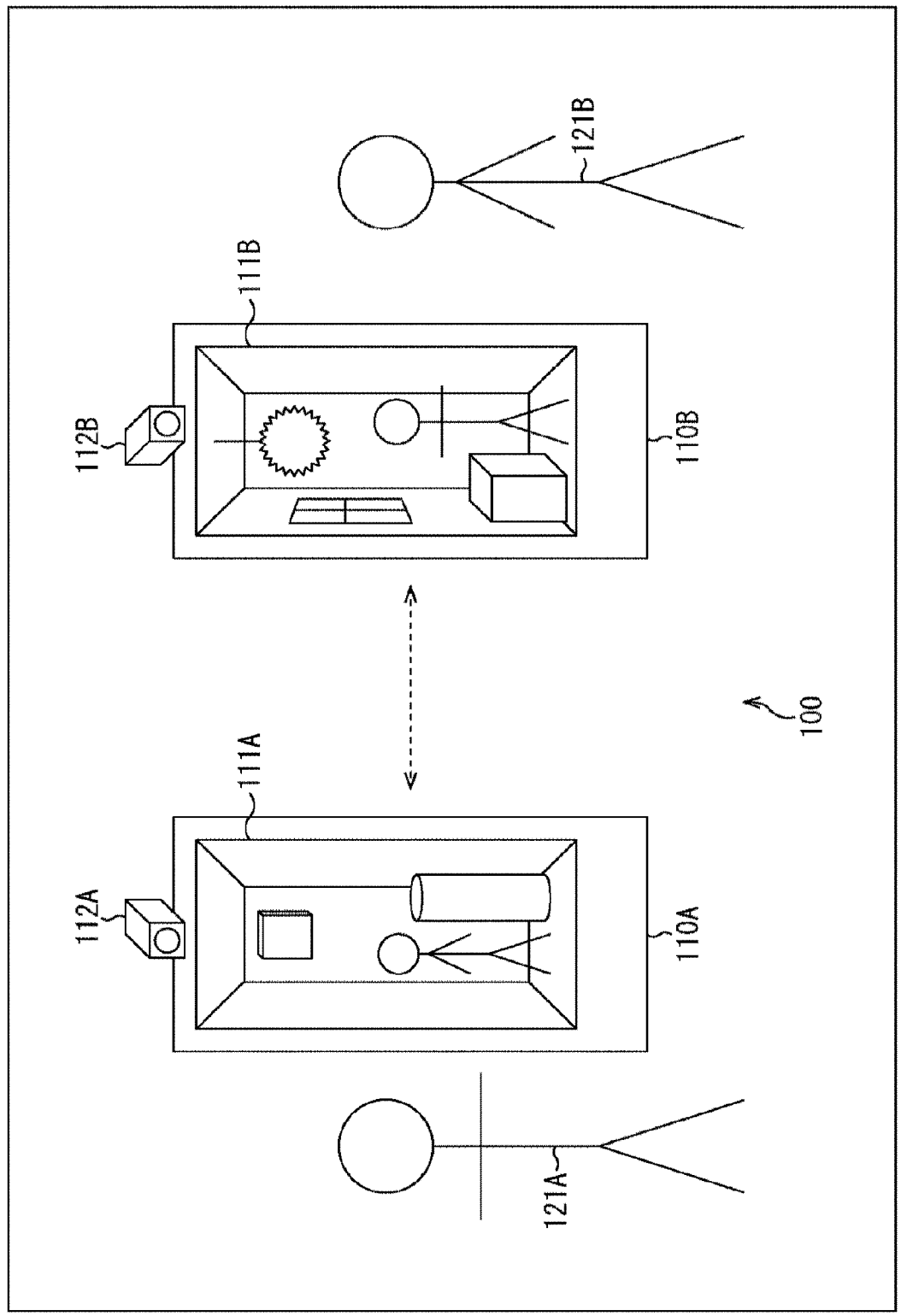
FIG. 1 is a diagram for illustrating an outline of a telepresence system.

FIG. 1 is a diagram for illustrating an outline of a telepresence system, which is an embodiment of a communication system (information processing system) to which the present technology is applied.

A telepresence system 100 is a communication system for users located in remote places from each other to communicate with each other. The telepresence system 100 includes a plurality of telepresence devices as terminal devices. For example, in a case of FIG. 1, the telepresence system 100 includes a telepresence device 110A and a telepresence device 110B. The telepresence device 110A and the telepresence device 110B are installed in remote places from each other.

In this specification, the remote place indicates a point at a different position with respect to a certain reference point. Then, it is assumed that respective spaces at a plurality of points in the remote places from each other are independent from each other. For example, it is assumed that a part of or an entire space at each point is physically blocked from a space at another point or sufficiently separated from the space at another point by an obstacle such as a ceiling, a floor, a wall, or any object (for example, including the telepresence device itself). Then, it is assumed that the users in the remote places from each other communicate with each other via the telepresence system 100 and do not communicate with each other directly by voice, gesture and the like.

The telepresence device 110A is provided with a display with touch panel 111A and a camera 112A. The telepresence device 110A is also provided with a microphone, a speaker and the like, but they are not illustrated. Similarly, the telepresence device 110B is provided with a display with touch panel 111B and a camera 112B. The telepresence device 110B is also provided with a microphone, a speaker and the like, but they are not illustrated.

The camera 112A captures an image of a space in front of the telepresence device 110A, for example, a user 121A of the telepresence device 110A, its surroundings and the like. Similarly, the camera 112B captures an image of a space in front of the telepresence device 110B, for example, a user 121B of the telepresence device 110B, its surroundings and the like. The telepresence device 110A and the telepresence device 110B communicate with each other, and transfer data of a captured image generated by the camera 112A and data of a captured image generated by the camera 112B.

Then, the captured image generated by the camera 112B, that is, the captured image of the space in front of the telepresence device 110B is displayed on the display with touch panel 111A. The captured image generated by the camera 112A, that is, the captured image of the space in front of the telepresence device 110A is displayed on the display with touch panel 111B.

Note that, the telepresence device 110A and the telepresence device 110B also exchange voice data collected by the microphones of the respective devices by this communication and output a voice from the speakers of the respective devices.

In this manner, the telepresence device 110A and the telepresence device 110B transfer the image and voice (for example, the image and voice of each user) in the space in which each device is arranged, so that the user 121A and the user 121B located in the remote places from each other may communicate with each other via the telepresence system.

Note that, the display with touch panel 111A is acquired by superimposing a touch panel on a display that displays an image. The touch panel detects a position touched by the user 121A and the like on a display surface of the display with touch panel 111A. In other words, the user 121A may perform an input operation of an instruction, information and the like via the touch panel by touching the display surface of the display with touch panel 111A.

Similarly, the display with touch panel 111B is obtained by superimposing a touch panel on a display that displays an image. The touch panel detects a position touched by the user 121B and the like on a display surface of the display with touch panel 111B. In other words, the user 121B may perform an input operation of an instruction, information and the like via the touch panel by touching the display surface of the display with touch panel 111B.

Hereinafter, in a case where it is not necessary to distinguish the telepresence device 110A and the telepresence device 110B from each other to describe, they are referred to as the telepresence device 110. Similarly, in a case where it is not necessary to distinguish the display with touch panel 111A and the display with touch panel 111B from each other to describe, they are referred to as the display with touch panel 111. Furthermore, in a case where it is not necessary to distinguish the camera 112A and the camera 112B from each other to describe, they are referred to as the camera 112. Then, in a case where it is not necessary to distinguish the user 121A and the user 121B from each other to describe, they are referred to as the user 121.

The telepresence system 100 always performs communication with high realistic feeling with an intention of allowing the users located in the remote places from each other to perform natural communication "as if they are in the same space", and improving a quality of a relationship of a team or a community including the users in both spaces without having any particular purpose, time frame and the like, for example.

While the telepresence devices 110 are connected to each other, an image of a space on a communication partner side (also referred to as a partner space) captured by the camera 112 on the communication partner side is always displayed on the display with touch panel 111.

Figure 2:
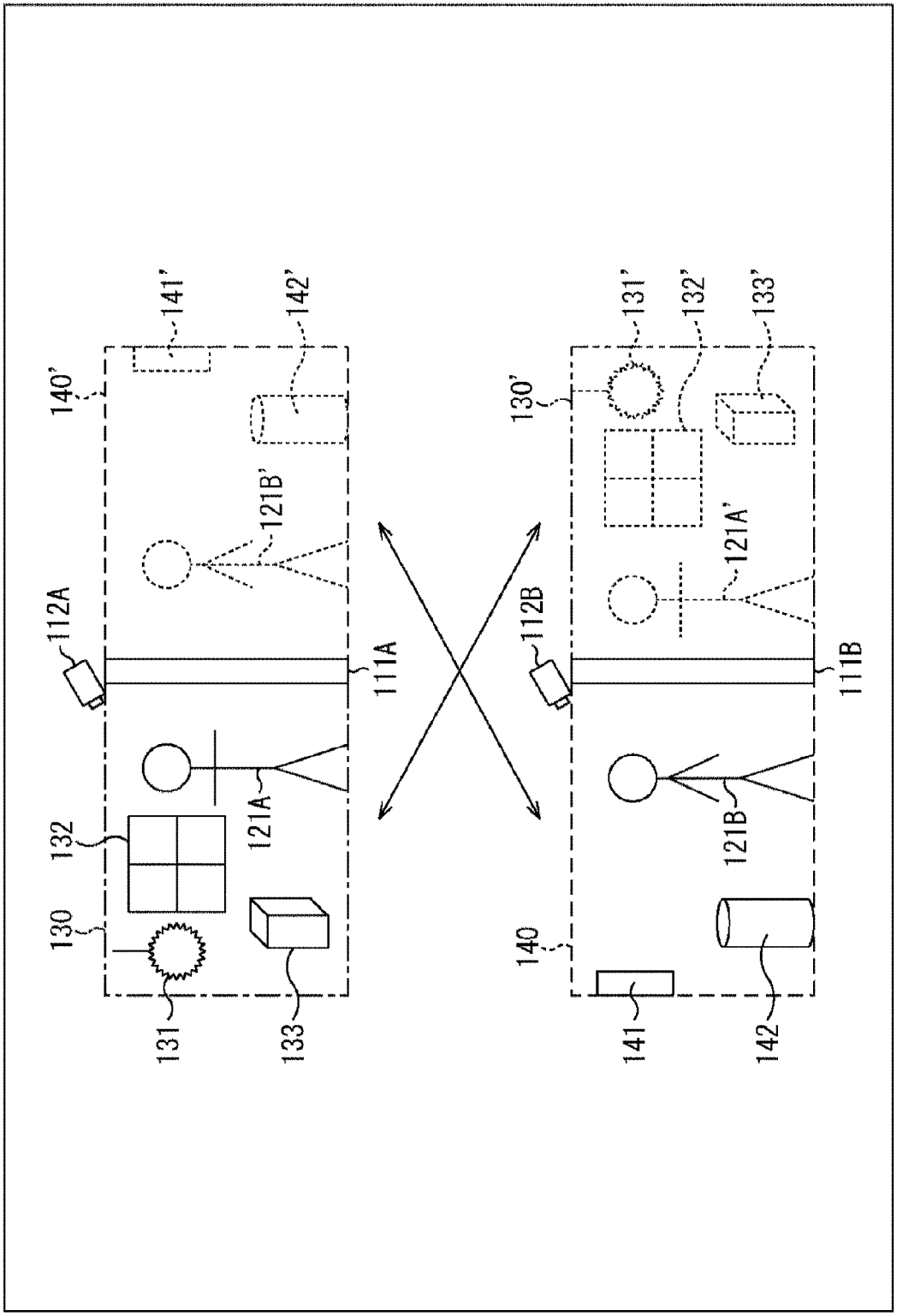
FIG. 2 is a diagram for illustrating the outline of the telepresence system.

For example, as illustrated in FIG. 2, a captured image of a space 140 on a user 121B side captured by the camera 112B is always displayed on the display with touch panel 111A installed in a space 130 on a user 121A side. That is, an image of the user 121B, an object 141, an object 142 and the like in the space 140 is displayed on the display with touch panel 111A.

Therefore, the user 121A located in the space 130 feels as if a space 140' corresponding to the space 140 exists on a back side of the display with touch panel 111A. For example, the user 121A feels as if a user 121B' corresponding to the user 121B, an object 141' corresponding to the object 141, an object 142' corresponding to the object 142 and the like exist on the back side of the display with touch panel 111A.

Similarly, a captured image of the space 130 on the user 121A side captured by the camera 112A is always displayed on the display with touch panel 111B installed in the space 140 on the user 121B side. That is, an image of the user 121A, an object 131, an object 132, an object 133 and the like in the space 130 is displayed on the display with touch panel 111B.

Therefore, the user 121B located in the space 140 feels as if a space 130' corresponding to the space 130 exists on a back side of the display with touch panel 111B. For example, the user 121B feels as if a user 121A' corresponding to the user 121A, an object 131' corresponding to the object 131, an object 132' corresponding to the object 132, an object 133' corresponding to the object 133 and the like exist on the back side of the display with touch panel 111B.

That is, the user 121A and the user 121B may feel as if they are (that is, the user 121 as the communication partner is) "in the same space (one space including the space 130 and the space 140)" and may communicate more naturally.

Therefore, it is possible to improve reliability and the quality of the relationship between the users 121 located in the remote places, and to strengthen the community and the team in an organization.

<Communication by Captured Image>

However, in such transfer of the captured image and voice with each other, real-time (immediate) communication may be easily performed, but it has been necessary for the users at the respective points to face each other at the same time and exchange. Therefore, it has been difficult to implement non-real-time (non-immediate) communication. For example, it has been difficult to implement transfer of information in which one user leaves a message to the other user at a certain time and the other user receives the message at a later time and the like.

<Digital Sticky Note>

Conventionally, there has been a "digital sticky note" that attaches any memo to a 2D desktop area (x,y) by a mouse operation and the like for the purpose of personal work and to-do organization. Furthermore, there has been a service in which a plurality of users may edit such digital sticky note. Moreover, it has been possible that the digital sticky note is arranged in a virtual whiteboard area so that recording or recall thereof may be performed.

However, such digital sticky note requires an area in which a plurality of users works in common, and a method for implementing in a system in which the captured image of each space is displayed such as the telepresence system 100 has not been considered.

Note that, there also is a method for arranging a tag in a three-dimensional space using dedicated goggles, gloves and the like, but there has been not only a risk of increasing a cost, but also a risk of giving an unnatural feeling or discomfort to the user by wearing such tool. Furthermore, there has been a risk that a sense of discomfort is visually given to the communication partner.

<Communication Using Tag Information>

Therefore, tag information is used so that communication may be performed. For example, in a space of a user, an input of information by the user is accepted, and tag information for associating control information for controlling occurrence of an event for a communication partner of the user with a space of the communication partner is generated using the accepted information.

For example, an information processing device is provided with an input unit that accepts the input of the information by the user in the space of the user, and a generation unit that generates the tag information for associating the control information for controlling the occurrence of the event for the communication partner of the user with the space of the communication partner using the information accepted by the input unit.

Furthermore, for example, it is determined whether or not an occurrence condition of the event designated by the tag information for associating the control information for controlling the occurrence of the event for the communication partner with the space of the communication partner, the tag information associated with the space of the user is satisfied, and in a case where it is determined that the occurrence condition is satisfied, the event designated by the tag information is allowed to occur.

For example, the information processing device is provided with a determination unit that determines whether or not the occurrence condition of the event designated by the tag information for associating the control information for controlling the occurrence of the event for the communication partner with the space of the communication partner, the tag information associated with the space of the user is satisfied, and an event occurrence unit that allows, in a case where it is determined that the occurrence condition is satisfied by the determination unit, the event designated by the tag information to occur.

In this manner, the user may easily arrange the tag information (additional information) for efficiently and effectively transmitting what the user wants to tell to a person whom the user wants to meet and a person whom the user wants to talk with via a display interface, while constant connection generates various combinations and accidental communications of persons.

For example, in a scene in which the users located in the remote places constantly connect their living/office spaces without a specific purpose or temporal restriction, they may set the tag information (additional information) to a place where the display is installed in the space, further at any point (x,y) on the display surface, and any point (x,y,z) or area in both the spaces having a 3D depth or an object arrangement by a natural and simple method such as a touch operation on the display and a voice input. Furthermore, the user who receives the information is induced to perform a new next action, so that more effective mutual interaction activation may be implemented.

<Input of Tag Information> As described above, the tag information (also referred to as a tag) is a function of associating the control information for controlling the occurrence of the event for the communication partner with the space of the communication partner. For example, in a case of FIG. 3A, the user 121A allows the telepresence device 110 to generate a tag associated with the partner space displayed on the display with touch panel 111A, and includes the control information for controlling the occurrence of the event for the communication partner in the tag.

<Designation of Attachment Target>

The user 121 designates a target with which the tag is associated (a target to which the tag is attached) from the partner space displayed on the display with touch panel 111. For example, the user 121 operates (the touch panel of) the display with touch panel 111, that is, touches the display with touch panel 111 and the like, thereby designating the target with which the tag is associated.

The telepresence device 110 accepts the designation by the touch panel and generates the tag to be attached to the designated target. For example, a sensor (the touch panel and the like) included in the telepresence device 110 recognizes context (state, situation) information and a touch input operation of the user who suddenly conceives of attaching a message tag, and selects a desired target from tagging target candidates of the partner space.

Figure 3:
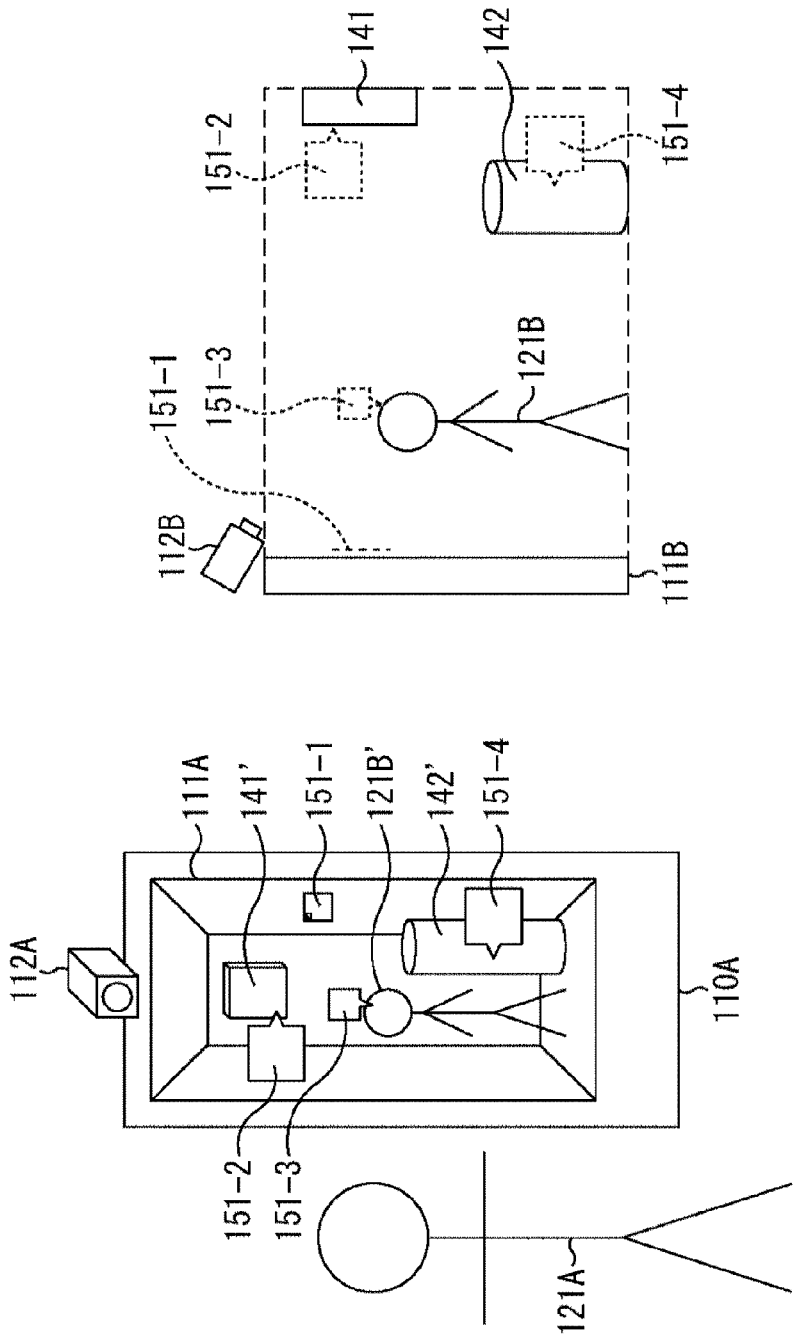
FIGS. 3A and 3B are diagrams for illustrating an outline of a tag.

This target is any target as long as this is in the partner space. For example, the target to which the tag is associated may be a predetermined object in the partner space. For example, in a case of FIG. 3A, the user 121A generates tags 151-1 to 151-4 and associates them with the partner space. As illustrated in FIG. 3B, the tag 151-1 is attached to the display with touch panel 111B. The tag 151-2 is attached to the object 141. The tag 151-3 is attached to the user 121B. Furthermore, the tag 151-4 is attached to the object 142. Note that, in a case where it is not necessary to distinguish the tags 151-1 to 151-4 from one another to describe, they are referred to as the tag 151.

The tag 151 input and generated by the user 121 is registered in a tag database of a server to be described later as multidimensional information such as spatial coordinates, a creating user, a destination user, and the occurrence condition of the event.

In this manner, the tag 151 may be attached to any object of the partner space. In this case, wherever the object moves to, the tag 151 remains attached to the object. That is, the tag 151 moves with the movement of the object. In addition, the tag 151 may also be attached to a moving object such as the user 121B.

Note that, in a case of the object that may go out of the partner space such as the user 121B, it is possible that the tag 151 is attached only while the object (user 121B) is located in the partner space. For example, when the user 121B to which the tag 151 is attached goes out of the partner space, it becomes a state in which the tag 151 is removed from the user 121B, and the event by the tag 151 does not occur regardless of the occurrence condition. Then, in a case where the user 121B enters the partner space again, the tag 151 is attached to the user 121B again, and it becomes a state in which the event by the tag 151 may occur. Such control may be performed.

Note that, the target to which the tag 151 is associated may be a predetermined position in the partner space. That is, the tag may be attached to any position of the partner space. In this case, for example, even if the object is moved, the tag 151 does not move. Furthermore, in this case, the tag 151 may also be attached to a place where no object exists, for example, in the air and the like.

As described above, the target with which the tag 151 is associated is designated by the user 121 touching the display with touch panel 111. That is, when the user 121 touches a predetermined position (x,y) of the display with touch panel 111, the telepresence device 110 detects the position (x,y) with the touch panel, and generates the tag information to be attached to the position and the object of the partner space corresponding to the position.

Figure 4:
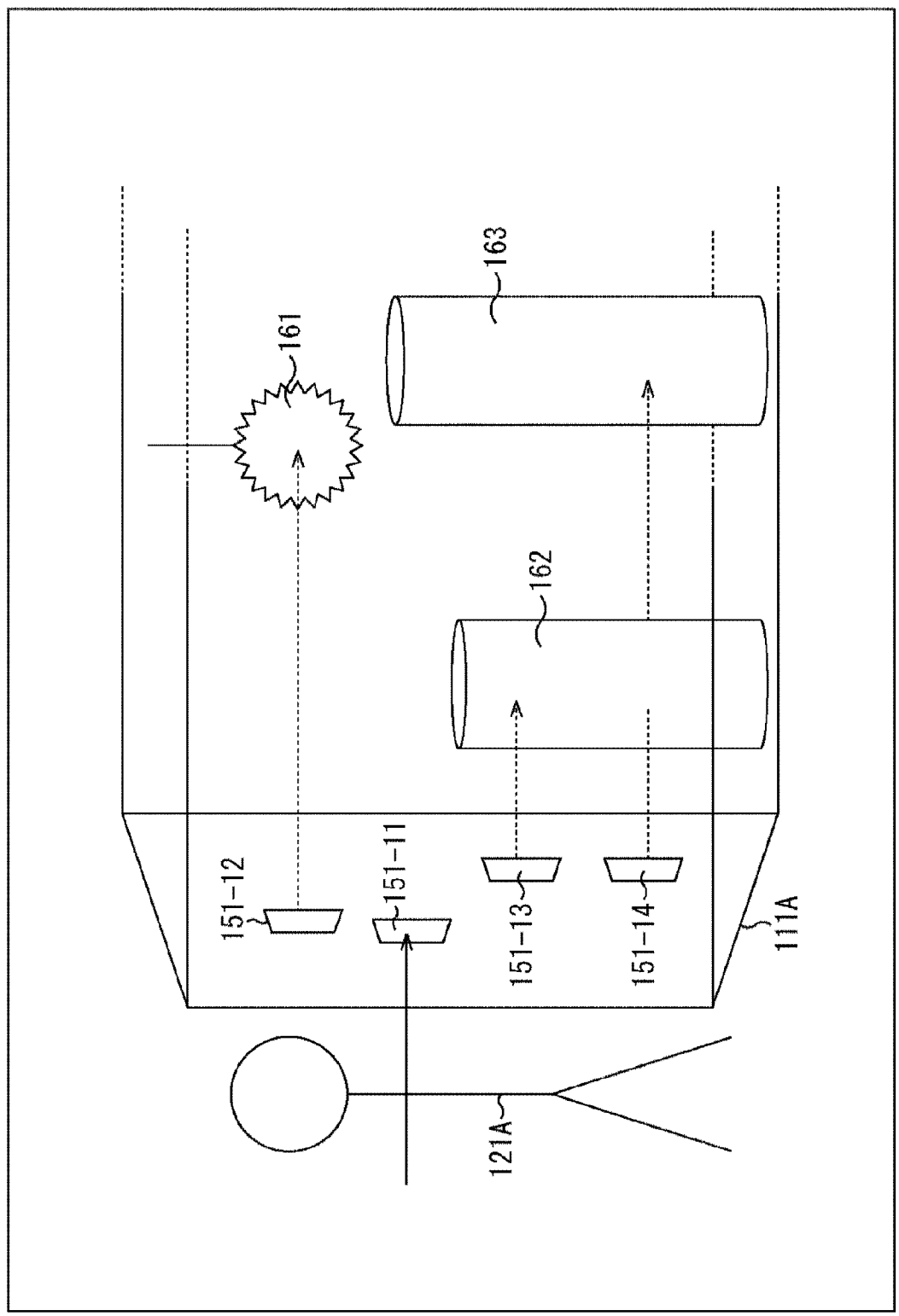
FIG. 4 is a diagram for illustrating an example of tag generation.

For example, in a case of FIG. 4, the tag 151-11 is attached to the display with touch panel 111B at a position (x,y) designated by the user 121A. Furthermore, the tag 151-12 is attached to an object 161 displayed at a position (x,y) designated by the user 121A on the display with touch panel 111A. Moreover, the tag 151-13 is attached to an object 162 displayed at a position (x,y) designated by the user 121A on the display with touch panel 111A. In a case where it is not necessary to distinguish the tags 151-11 to 151-13 from one another to described, they are referred to as the tag 151.

For example, by recognizing a depth or object arrangement of a space by a 3D depth sensor, an in-image simultaneous localization and mapping (SLAM) technology and the like, a target position or object may be selected in a depth direction. That is, it is possible to set in association with not only any place (x,y) on the display surface but also a space in the back (x,y,z), and dynamically changing object and person.

The designation in a depth direction (z) of the position and object to which the tag 151 is to be attached may be performed according to a length of a time during which the user 121 touches the display with touch panel 111 with hand and the like. That is, the telepresence device 110 may measure the time during which the user 121 touches the display with touch panel 111 when designating the target to which the tag 151 is to be attached, and specify the target designated by the user 121 in the depth direction (z) according to the length of the time.

For example, in a case where the object is designated as the target to which the tag 151 is to be attached as illustrated in FIG. 4, the tag 151-14 is attached to one of the object 162 and the object 163 corresponding to the position (x,y), the object corresponding to the length of the time during which the user 121A touches the display with touch panel 111A with hand and the like.

For example, it is possible that the object 162 is selected as an attachment target of the tag 151-14 in a case where the touch time is equal to or shorter than a predetermined threshold, and the object 163 is selected as the attachment target of the tag 151-14 in a case where the touch time is longer than the threshold. Furthermore, other way round, it is possible that the object 163 is selected as the attachment target of the tag 151-14 in a case where the touch time is equal to or shorter than a predetermined threshold, and the object 162 is selected as the attachment target of the tag 151-14 in a case where the touch time is longer than the threshold.

Moreover, it is possible that the attachment target of the tag 151-14 is switched every predetermined time while the user 121A touches the display with touch panel 111A. Then, the object (either the object 162 or the object 163) selected when the user 121A stops touching the display with touch panel 111 (when the hand and the like touching the display with touch panel 111A is released from the display with touch panel 111A) may be specified as the attachment target of the tag 151-14.

Furthermore, in a case where the position is designated as the target to which the tag 151 is attached, it is possible that the tag 151 is attached to the position in the depth direction corresponding to the length of the time during which the user 121 touches the display with touch panel 111 with hand and the like. For example, the tag 151 may be attached on a nearer side as the touch time is shorter, and the tag 151 may be attached on a farther side as the touch time is longer. Other way round, the tag 151 may be attached on a nearer side as the touch time is longer, and the tag 151 may be attached on a farther side as the touch time is shorter. Furthermore, while the user 121 touches the display with touch panel 111, such a change in position designated as the target to which the tag 151 is to be attached may be repeated, or it is possible to reciprocate from a near side to a far side or from the far side to the near side.

<Designation of Event Occurrence Condition>

This tag information allows the event to occur in a case where a predetermined condition is satisfied in the partner space. The user 121 may designate the occurrence condition of the event (trigger for activating the event). For example, the user 121 designates the occurrence condition of the event by touching (the touch panel of) the display with touch panel 111 and the like. The telepresence device 110 accepts the designation with the touch panel and generates the tag including information regarding the designated occurrence condition.

This occurrence condition (trigger) is any condition. For example, a case where the user of the communication partner touches the tag 151 (or the target to which the tag 151 is attached) or a case where the user of the communication partner is located in the vicinity of the tag 151 (or the target to which the tag 151 is attached) may be made the occurrence condition. Furthermore, for example, appearance of a specific user in the partner space may be made the occurrence condition.

Furthermore, for example, a condition regarding an environment in the space of the communication partner may be made the occurrence condition. For example, a change in environmental information (it gets dark, something is heard, temperature decreases and the like) and the like in the partner space may be made the occurrence condition.

Moreover, for example, a condition regarding time may be made the occurrence condition. For example, a predetermined time period or time may be made the occurrence condition.

<Designation of Event>

Furthermore, the user 121 may designate the event allowed to occur by the tag 151. For example, the user 121 designates the event allowed to occur by touching (the touch panel of) the display with touch panel 111 and the like. The telepresence device 110 accepts the designation with the touch panel and generates the tag 151 including information regarding the designated event.

A content of the event is any content. For example, this may be display of a message (capable of including a text and an image), or reading of the message (voice output). Furthermore, this may be illumination control (for example, on/off, change in brightness, change in color and the like) of the partner space or back ground music (BGM) control (for example, start or stop of BGM output, music selection, volume adjustment and the like) in the partner space. Moreover, this may be air conditioning control (on/off, change in temperature setting, switching of operation type (heating, cooling, ventilation, drying and the like), change in wind direction setting, change in wind volume setting and the like) of the partner space. Furthermore, this may be vibration control of an object (for example, vibration according to the message and the like). It goes without saying that a plurality of events may be combined.

<Designation of Plurality of Tags>

Note that, for example, candidate targets are recommended by moving the finger up and down and right to left after creating the tag 151 by pressing long at touched coordinates for a certain period of time, and by an operation such as releasing the finger (touch) when a desired selected object is set, a plurality of targets (display (x,y), space (x,y,z), object, area, person and the like) in the partner space may be selected.

<Information Inputting Method>

Note that, a method of an input operation regarding the generation of such tag 151 is any method. As described above, the user 121 may input information and instructions by operating the touch panel of the display with touch panel 111. Furthermore, the user may input the information and instructions by operating another input device (for example, a keyboard, a mouse, another touch panel, an image sensor, a motion sensor, a button, a switch, a lever, a microphone and the like) provided on the telepresence device 110.

<Occurrence of Event> As illustrated in FIG. 3A, the tag 151 generated as described above and attached to the partner space is displayed on the display with touch panel 111 of the telepresence device 110 that generates the tag 151 so as to be superimposed on the captured image of the partner space. That is, in the space of the user (also referred to as a self space), the tag 151 attached to the partner space may be seen.

However, the tag 151 is not basically displayed on the display with touch panel 111 of the telepresence device 110 of the partner space to which the tag 151 is attached. That is, the tag 151 is basically invisible in the partner space.

However, as described above, when the occurrence condition set for the tag 151 is satisfied, the event set for the tag 151 occurs. For example, in a case of FIG. 5, when the user 121B touches the object 162 to which the tag 151-13 (not visible to the user 121B) is attached, the event occurrence condition of the tag 151-13 is satisfied, and the event set for the tag 151-13, in this case, the voice reading out the message of "Hello! Tom!" is output from a speaker 171 of the telepresence device 110B.

Note that, the occurrence of the event may be performed by a device other than the telepresence device 110. For example, it is possible to cause the event to occur (for example, a message or information are read out and the like) by a speaker, an indicator, an actuator and the like provided on an object to which the tag is to be attached. Furthermore, for example, drive control and the like of illumination or air conditioning (on/off, setting change and the like) may be made the event.

In this manner, by attaching the tag 151, the event may be allowed to occur on the basis of the occurrence condition, and non-real-time communication may be implemented. For example, the user of the self space attaches the tag 151 as in the example in FIG. 5 to the partner space while the user of the communication partner is absent from the partner space, and thereafter, when the user of the communication partner enters the partner space and the event occurrence condition is satisfied, the message may be output. Therefore, more various communications may be implemented.

<Visual Recognition of Tag>

Figure 5:
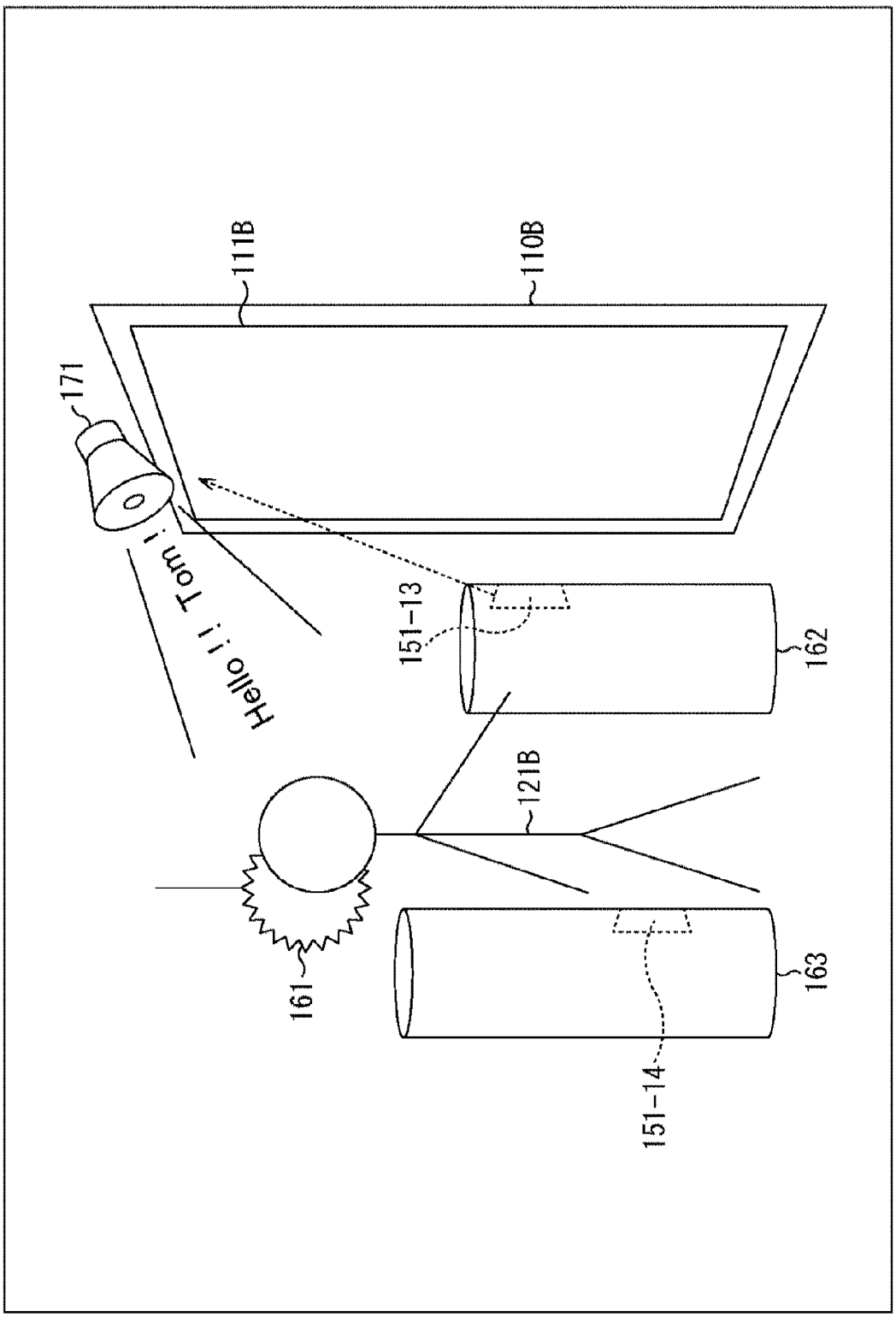
FIG. 5 is a diagram for illustrating an example of event occurrence.

Note that, in a case of the example in FIG. 5, as described above, the user 121B cannot see the tag 151-13, and allows the event to occur in a state in which even the presence of the tag 151-13 is not grasped, not to mention the occurrence condition of the event. That is, for the user 121B, the message is output by voice unintentionally. In this manner, by using the tag 151, communication with an entertainment property such as a surprise impact may be implemented.

Note that, it is possible that the user 121 may visually recognize the tag 151 attached to the self space by the communication partner. For example, the tag 151 may be displayed on the object to which the tag 151 is to be attached using a projector and the like. Furthermore, it is possible that only the tag 151 attached to the display with touch panel 111 is displayed on the display with touch panel 111. For example, in a case of FIG. 3A, it is possible that only the tag 151-1 is displayed on the display with touch panel 111B.

<Characteristic of Communication Using Tag Information>

As described above, the communication using the tag 151 may be used in a scene in which the users located in the remote places (including the users located in the same space) constantly connect their living spaces or office spaces without a specific purpose or temporal restriction.

Furthermore, the tag 151 may be set to a place where the display is installed in the space, further at any point (x,y) on the display surface, and any point (x,y,z) or area in both the spaces having a 3D depth or an object arrangement by a natural and simple method such as a touch operation on the display and a voice input.

Moreover, the user who receives the information is induced to perform a new next action, so that more effective mutual interaction activation may be implemented.

The telepresence device 110 of the telepresence system 100 described above may be installed so as to be blended with a space (for example, as if this is a window), does not require specification or attachment of special equipment at the time of operation, and may be implemented only by a natural method such as a touch operation or a voice input.

<Telepresence System Configuration>

Figure 6:
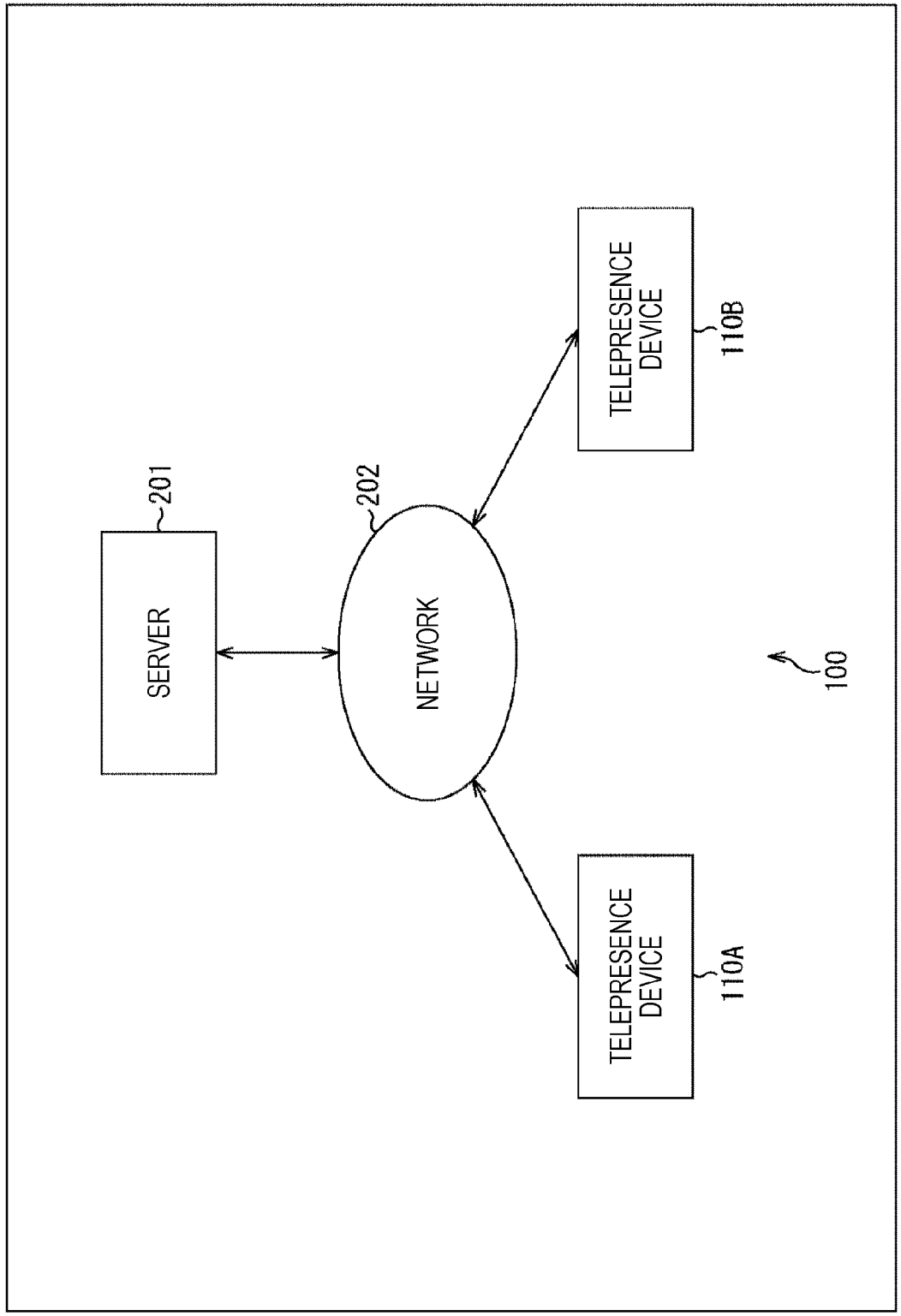
FIG. 6 is a block diagram illustrating a principal configuration example of the telepresence system.

FIG. 6 is a diagram illustrating a principal configuration example of the telepresence system 100. As illustrated in FIG. 6, the telepresence system 100 includes a plurality of telepresence devices 110 and a server 201.

Although the telepresence device 110A and the telepresence device 110B are illustrated in FIG. 6, the number of the telepresence devices 110 forming the telepresence system 100 is any number as long as this is two or more. That is, the telepresence system 100 may include three or more telepresence devices 110.

The telepresence devices 110 are installed at respective points (remote places from each other) at which the communication is performed. Each telepresence device 110 and the server 201 are connected to each other so as to be able to communicate with each other via a network 202.

The server 201 provides a service regarding the tag information in the communication between the telepresence devices 110. More specifically, the server 201 manages the tag information generated in each telepresence device 110.

The network 202 is a communication network including any communication medium. The communication performed via the network 202 may be wired communication, wireless communication, or both of them. That is, the network 202 may be the communication network for wired communication, a communication network for wireless communication, or a communication network including both of them. Furthermore, the network 202 may include single communication network, or a plurality of communication networks.

For example, the Internet may be included in the network 202. Furthermore, a public telephone line network may be included in the network 202. Moreover, a wide-area communication network for a wireless mobile body such as so-called 3G line and 4G line may be included in the network 202. Furthermore, a wide area network (WAN), a local area network (LAN) and the like may be included in the network 202. Moreover, a wireless communication network that performs communication conforming to Bluetooth (registered trademark) standard may be included in the network 202. Furthermore, a communication path of short-range wireless communication such as near field communication (NFC) may be included in the network 202. Moreover, a communication path of infrared communication may be included in the network 202. Furthermore, a communication network for wired communication conforming to a standard such as high-definition multimedia interface (HDMI) (registered trademark) or universal serial bus (USB) (registered trademark) may be included in the network 202. In this manner, the network 202 may include a communication network or a communication path of any communication standard.

Each telepresence device 110 and the server 201 are connected to the network 202 by wired communication, wireless communication, or both of them.

Hereinafter, as an example of the event, the message output (display, voice output and the like) is described.

<Configuration of Telepresence Device>

Figure 7:
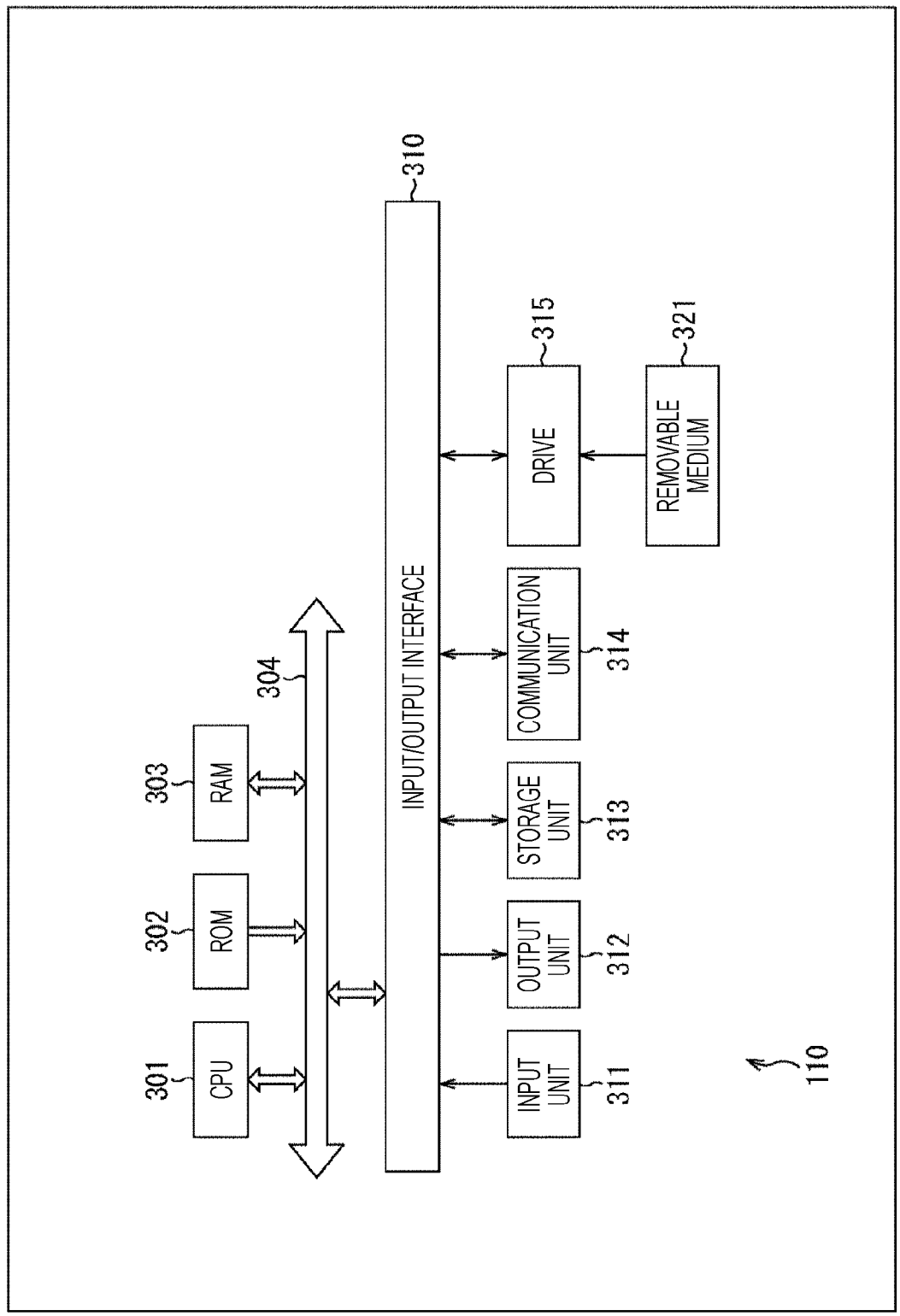
FIG. 7 is a block diagram illustrating a principal configuration example of a telepresence device.

FIG. 7 is a block diagram illustrating a principal configuration example of the telepresence device 110. In the telepresence device 110 illustrated in FIG. 7, a central processing unit (CPU) 301, a read only memory (ROM) 302, and a random access memory (RAM) 303 are connected to one another via a bus 304.

An input/output interface 310 is also connected to the bus 304. An input unit 311, an output unit 312, a storage unit 313, a communication unit 314, and a drive 315 are connected to the input/output interface 310.

The input unit 311 may include any input device such as, for example, a keyboard, a mouse, a microphone, a touch panel, an image sensor (for example, the camera 112 and the like), a motion sensor, and various other sensors. Furthermore, the input unit 311 may include an input terminal. The output unit 312 may include any output device such as, for example, a display (for example, the display with touch panel 111), a projector, and a speaker (for example, the speaker 171). Furthermore, the output unit 312 may include an output terminal.

The storage unit 313 is provided with, for example, any storage medium such as a hard disk, a RAM disk, and a non-volatile memory, and a storage control unit that writes and reads information to and from the storage medium. The communication unit 314 includes a network interface, for example. The drive 315 drives any removable medium 321 such as a magnetic disk, an optical disk, a magneto-optical disk, or a semiconductor memory, and writes or reads information to or from the removable medium.

In the telepresence device 110 configured in the above-described manner, the CPU 301 loads a program stored in the storage unit 313, for example, on the RAM 303 via the input/output interface 310 and the bus 304 to execute, thereby implementing various functions indicated by functional blocks to be described later. Data required for the CPU 301 to execute various pieces of processing of the program is also appropriately stored in the RAM 303.

The program executed by the computer may be recorded in the removable medium 321 as a package medium and the like to be applied, for example. In this case, the program may be installed on the storage unit 313 via the input/output interface 310 by mounting the removable medium 321 on the drive 315.

Furthermore, the program may also be provided via a wired or wireless transmission medium such as a local area network, the Internet, and digital satellite broadcasting. In this case, the program may be received by the communication unit 314 to be installed on the storage unit 313.

In addition, the program may be installed in advance on the ROM 302 and the storage unit 313.

<Functional Block of Telepresence Device>

Figure 8:
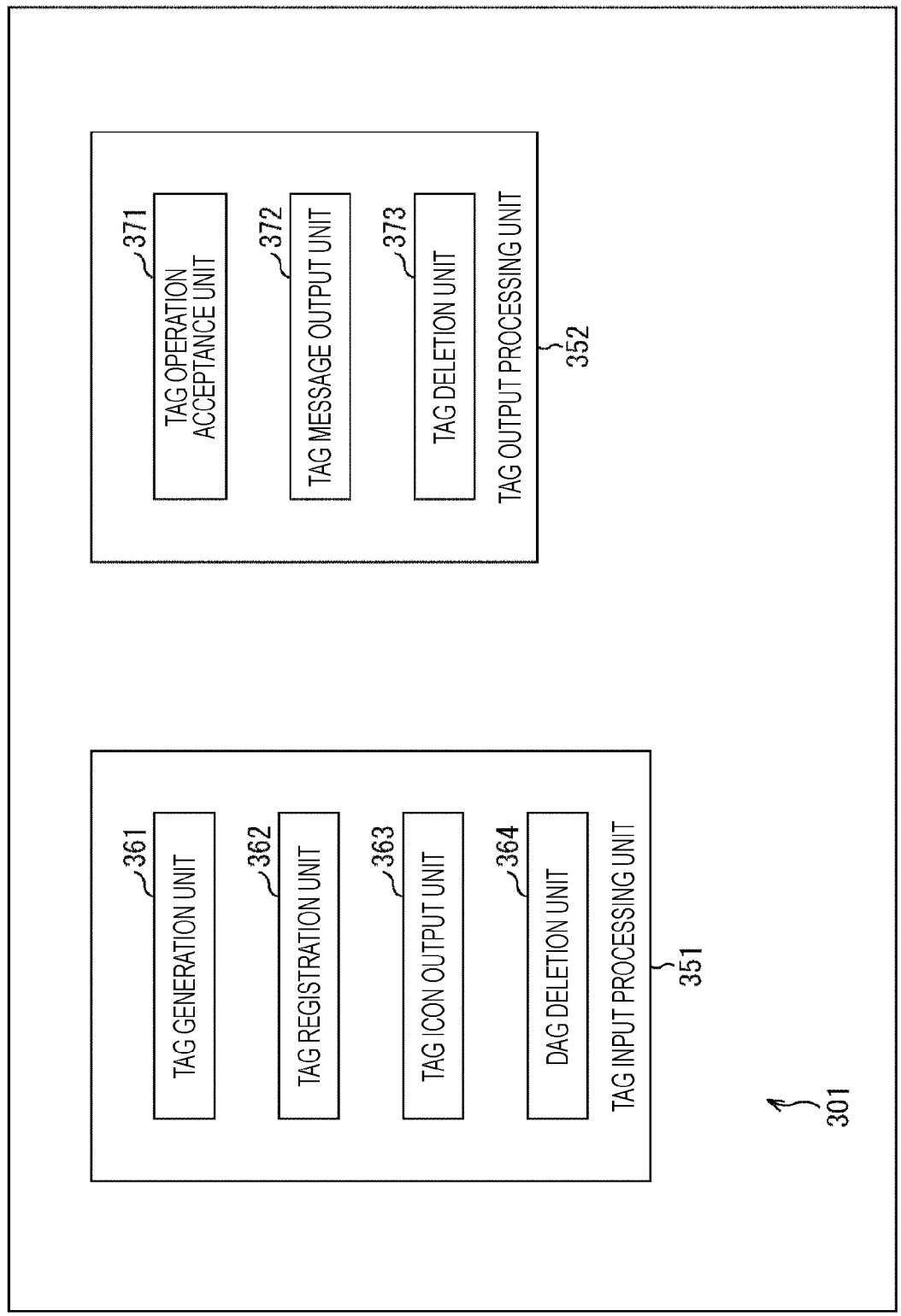
FIG. 8 is a functional block diagram illustrating a principal function example implemented by the telepresence device.

In the telepresence device 110 as described above, the CPU 301 executes the program, thereby implementing the functions indicated by the functional blocks as illustrated in FIG. 8, for example. That is, the telepresence device 110 is provided with a tag input processing unit 351 and a tag output processing unit 352 as the functional blocks.

The tag input processing unit 351 performs processing regarding acceptance of an input of information regarding generation of the tag 151 and the like. The tag output processing unit 352 performs processing regarding an output of the tag 151, that is, the occurrence of the event indicated by the tag 151.

The tag input processing unit 351 includes a tag generation unit 361, a tag registration unit 362, a tag icon output unit 363, and a tag deletion unit 364.

The tag generation unit 361 performs processing regarding the generation of the tag 151. The tag registration unit 362 performs processing regarding registration of the tag 151 in the server 201 (a tag database 431 to be described later). The tag icon output unit 363 performs processing regarding an output of an icon of the tag 151 (an image for display indicating the tag 151). The tag deletion unit 364 performs processing regarding deletion of the registered tag 151 from the server 201 (the tag database 431 to be described later).

The tag output processing unit 352 includes a condition determination unit 371, a tag message output unit 372, and a tag deletion unit 373.

The condition determination unit 371 performs processing regarding determination of a condition regarding an output of the tag message (that is, the occurrence of the event). The tag message output unit 372 performs processing regarding the output of the tag message that is the event designated by the tag 151 (that is, the occurrence of the event). The tag deletion unit 364 performs processing regarding deletion of the registered tag 151 from the server 201 (the tag database 431 to be described later).

<Configuration of Tag Data>

Figure 9:
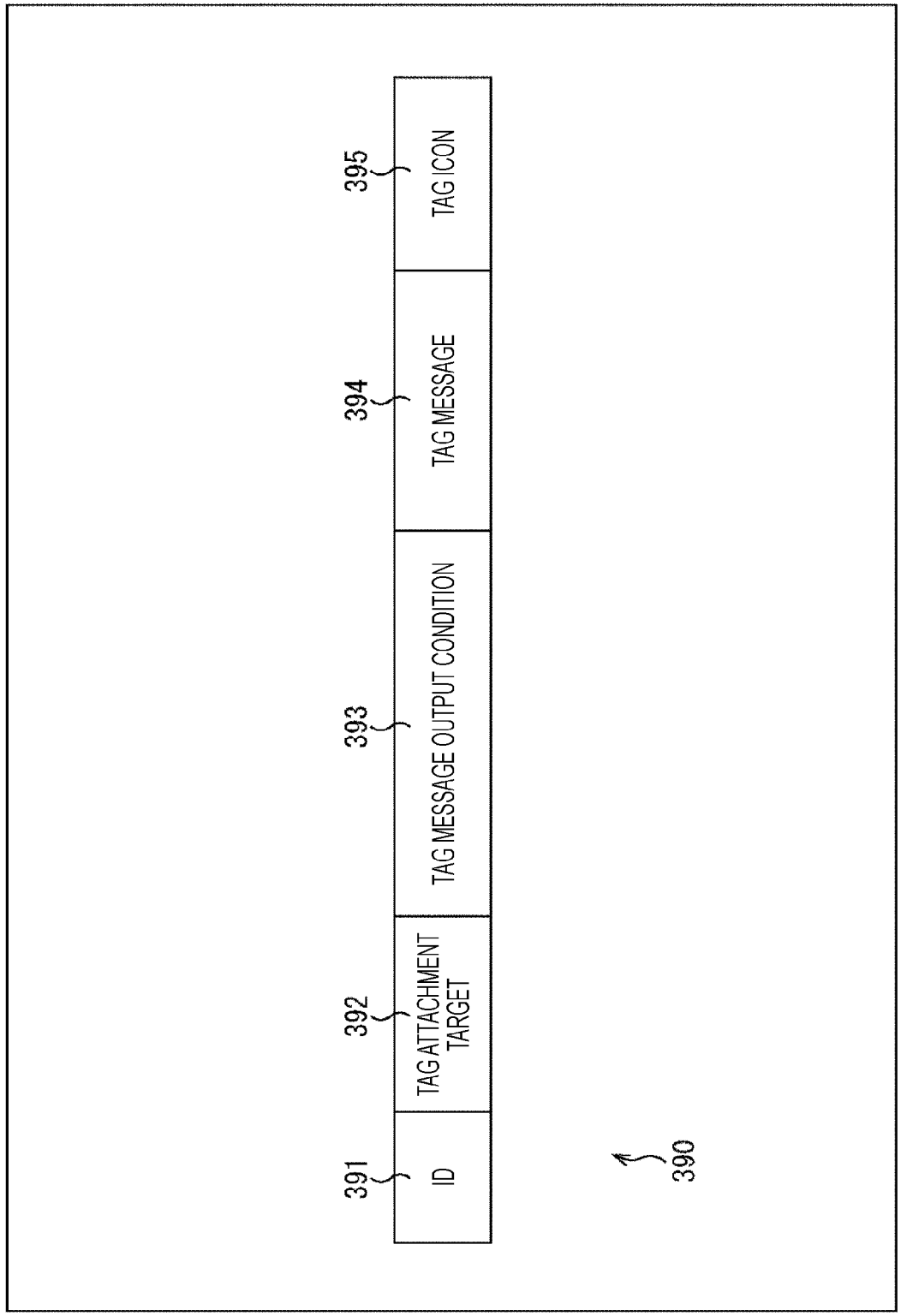
FIG. 9 is a diagram illustrating a principal configuration example of a tag.

FIG. 9 is a diagram for illustrating a principal configuration example of data (also referred to as tag data) of the tag 151 generated by the tag generation unit 361 in FIG. 8. As illustrated in FIG. 9, tag data 390 is the data of the tag 151, and includes, for example, an ID 391, a tag attachment target 392, a tag message output condition 393, a tag message 394, and a tag icon 395.

The ID 391 is identification information for identifying the tag data 390. For example, the ID 391 may include information of the user who created the tag and the like. The tag attachment target 392 is information for designating a target to which the tag 151 is attached. For example, the tag attachment target 392 may include information of a space (or the telepresence device 110 located in the space) associated with the tag, identification information of a target object, target coordinates and the like. The tag message output condition 393 is information for designating an output condition of the message (also referred to as the tag message) output as the event by the tag 151. For example, the tag message output condition 393 may include information such as a phenomenon, environment, and time serving as the occurrence condition, and identification information of the user as a destination of the tag (the target of the event that occurs). The tag message 394 is information for designating the tag message output as the event by the tag 151. For example, the tag message 394 may include text data, voice data, image data and the like of the tag message. The tag icon 395 is information for designating a tag icon. For example, the tag icon 395 may include an image of the tag icon. These pieces of information are set by the tag generation unit 361.

<Configuration of Server>

Figure 10:
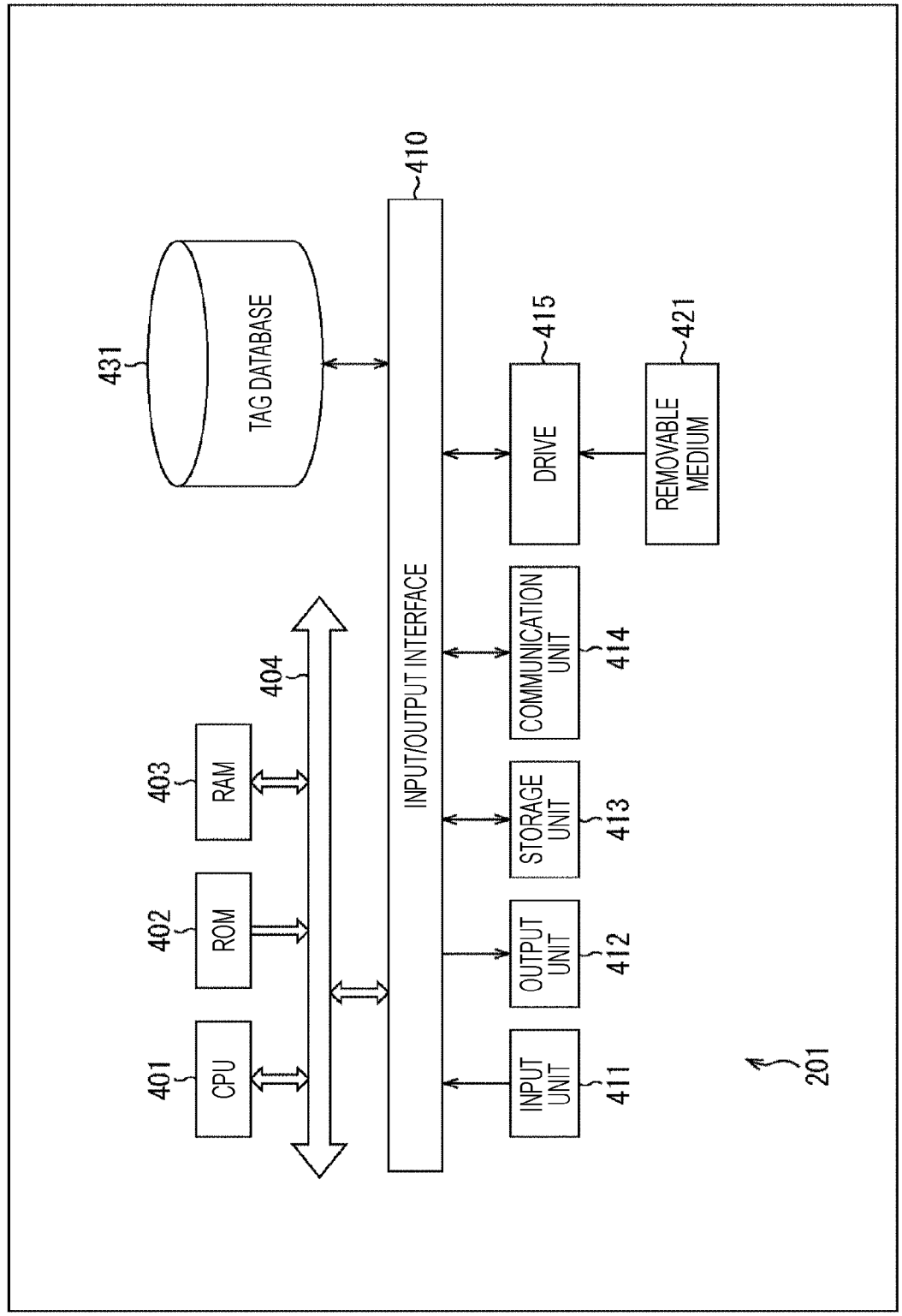
FIG. 10 is a block diagram illustrating a principal configuration example of a server.

FIG. 10 is a block diagram illustrating a principal configuration example of the server 201. A CPU 401, a ROM 402, and a RAM 403 are connected to one another via a bus 404 in the server 201 illustrated in FIG. 10.

An input/output interface 410 is also connected to the bus 404. An input unit 411, an output unit 412, a storage unit 413, a communication unit 414, and a drive 415 are connected to the input/output interface 410. Moreover, a tag database 431 is connected to the input/output interface 410.

The input unit 411 may include any input device such as, for example, a keyboard, a mouse, a microphone, a touch panel, a camera (an image sensor), a motion sensor, and various other sensors. Furthermore, the input unit 411 may include an input terminal. The output unit 412 may include any output device such as, for example, a display, a projector, and a speaker. Furthermore, the output unit 412 may include an output terminal.

The storage unit 413 is provided with, for example, any storage medium such as a hard disk, a RAM disk, and a non-volatile memory, and a storage control unit that writes and reads information to and from the storage medium. The communication unit 414 includes, for example, a network interface. The drive 415 drives any removable medium 421 such as a magnetic disk, an optical disk, a magneto-optical disk, or a semiconductor memory, and writes or reads information to or from the removable medium.

The tag database 431 stores and manages information regarding the tag 151. In the telepresence system 100, it is possible that context (situation/state) of the user 121 or the space may be recognized. In this case, the tag database 431 may record and manage the information as multidimensional meta information in association with additional information such as the tag 151, and may integrate to reproduce a plurality of pieces of information as necessary.

In the server 201 configured in the above-described manner, the CPU 401 loads a program stored in the storage unit 413, for example, on the RAM 403 via the input/output interface 410 and the bus 404 to execute, thereby implementing various functions indicated by functional blocks to be described later. Data required for the CPU 401 to execute various pieces of processing of the program is also appropriately stored in the RAM 403.

The program executed by the computer may be recorded in the removable medium 421 as a package medium and the like to be applied, for example. In this case, the program may be installed on the storage unit 413 via the input/output interface 410 by mounting the removable medium 421 on the drive 415.

Furthermore, the program may also be provided via a wired or wireless transmission medium such as a local area network, the Internet, and digital satellite broadcasting. In this case, the program may be received by the communication unit 414 to be installed on the storage unit 413.

In addition, the program may be installed in advance on the ROM 402 and the storage unit 413.

<Functional Block of Server>

Figure 11:
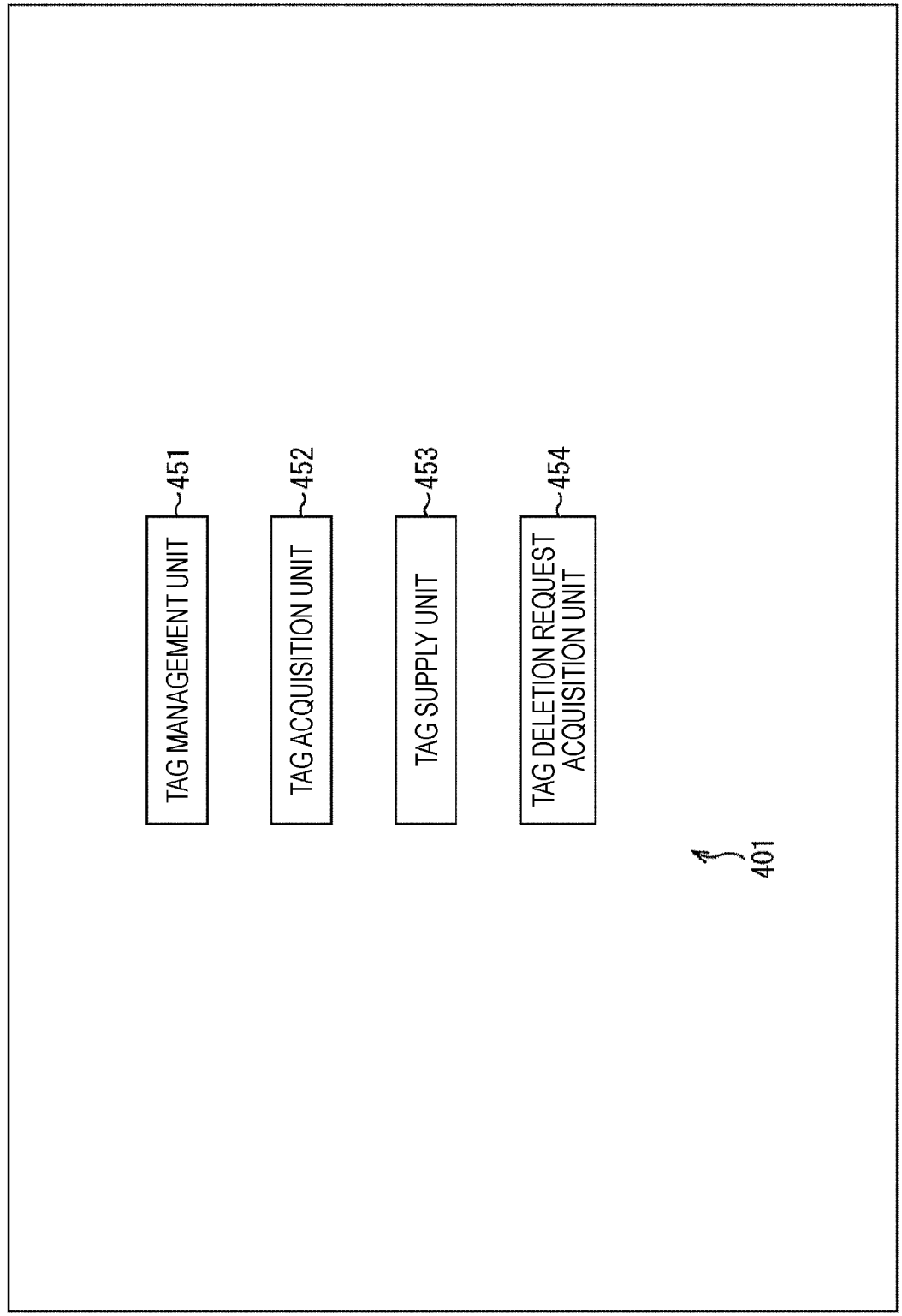
FIG. 11 is a functional block diagram illustrating a principal function example implemented by the server.

In the server 201 as described above, the CPU 401 executes a program, thereby implementing functions indicated by functional blocks as illustrated in FIG. 11, for example. That is, the server 201 is provided with, as the functional blocks, a tag management unit 451, a tag acquisition unit 452, a tag supply unit 453, and a tag deletion request acquisition unit 454.

The tag management unit 451 uses the tag database 431 to manage the tag generated in the telepresence device 110. The tag acquisition unit 452 performs processing regarding acquisition of the tag 151 supplied from the telepresence device 110. The tag supply unit 453 performs processing regarding supply of the tag 151 to the telepresence device 110. The tag deletion request acquisition unit 454 performs processing regarding acquisition of a deletion request of the tag 151 supplied from the telepresence device 110.

<Flow of Processing regarding Generation/Registration of Tag>

Figure 12:
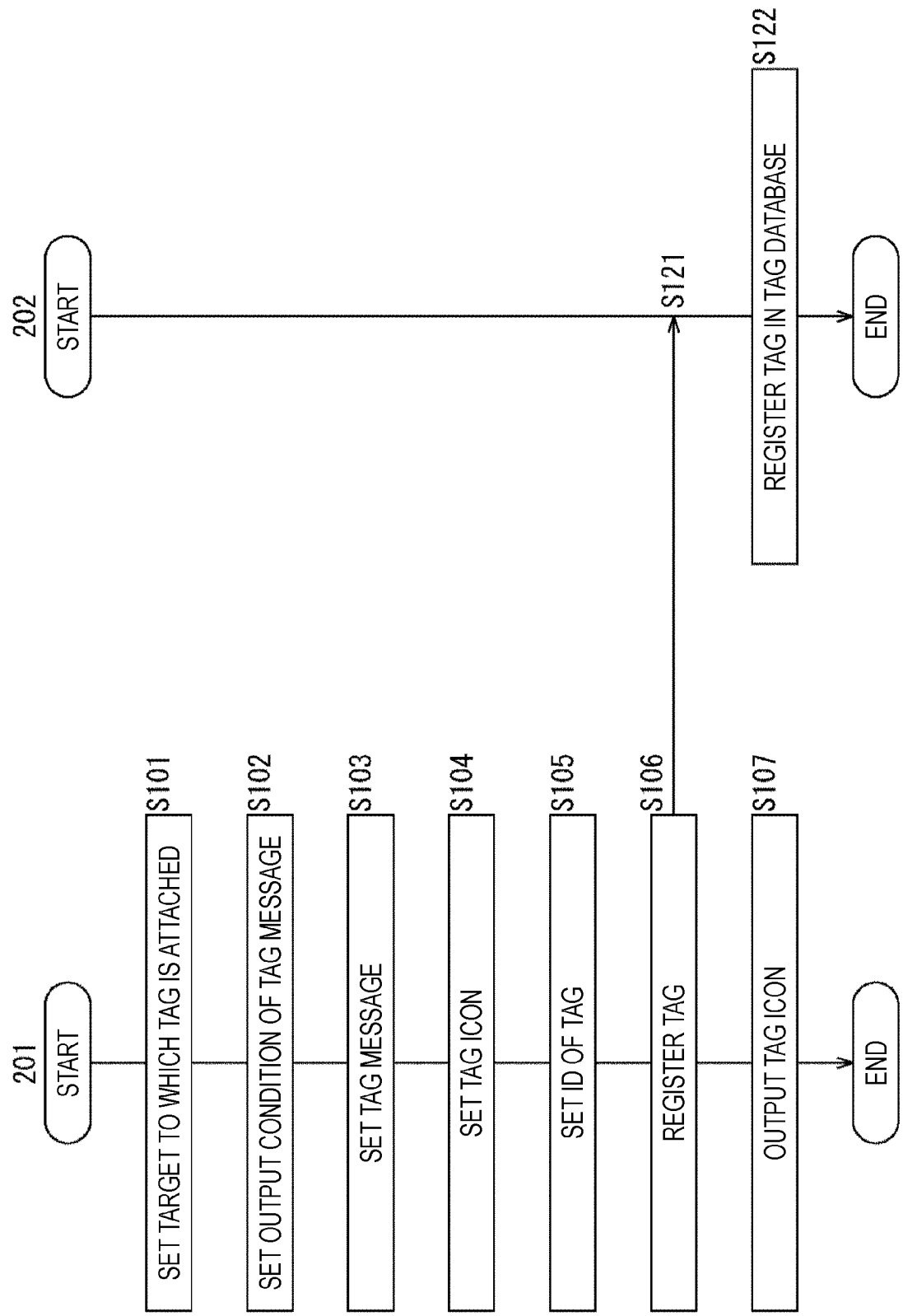
FIG. 12 is a flowchart for illustrating an example of a flow of tag registration processing.

Next, an example of a flow of processing from generation of the tag 151 (tag data 390) to be attached to the partner space to registration of the tag 151 in the tag database 431 of the server 201 in the telepresence device 110 is described with reference to a flowchart in FIG. 12.

The user 121 may display an area in which a tag message is written while touching the display surface of the display with touch panel 111 (the partner space appearing in a field angle of the camera 112), for example, and write the tag message in the area by voice input and the like.

When the processing is started, the tag generation unit 361 of the telepresence device 110 sets the attachment target of the tag 151 at step S101. For example, the user 121 inputs designation of the attachment target of the tag 151 by touching a position to which the tag 151 is to be attached or a position corresponding to an object in the partner space on the display with touch panel 111 on which the partner space is displayed with a finger and the like. The tag generation unit 361 accepts the designation via the input unit 311 and sets the designated position or object as the attachment target of the tag 151. Therefore, for example, the tag attachment target 392 of the tag data 390 (FIG. 9) is generated.

At step S102, the tag generation unit 361 sets the output condition of the tag message. For example, the user 121 operates the display with touch panel 111 or inputs a voice to designate the output condition of the tag message. The tag generation unit 361 accepts the designation via the input unit 311, and sets the output condition of the tag message on the basis of the designation. Therefore, for example, the tag message output condition 393 of the tag data 390 (FIG. 9) is generated.

At step S103, the tag generation unit 361 sets the tag message. For example, the user 121 operates the display with touch panel 111 or inputs the voice to designate the tag message as the event. The tag generation unit 361 accepts the designation via the input unit 311 and sets the tag message on the basis of the designation. Therefore, for example, the tag message 394 of the tag data 390 (FIG. 9) is generated.

At step S104, the tag generation unit 361 sets the tag icon. The tag icon is, for example, an image indicating the tag 151 attached to the partner space displayed on the display with touch panel 111 on the side that attaches the tag 151 (self space). It is possible that a predetermined image is set as the tag icon, but the user 121 and the like may designate the image of the tag icon. In that case, for example, the user 121 operates the display with touch panel 111 and the like to designate the image set as the tag icon. The tag generation unit 361 accepts the designation via the input unit 311 and sets the tag message on the basis of the designation. Therefore, for example, the tag icon 395 of the tag data 390 (FIG. 9) is generated.

At step S105, the tag generation unit 361 sets identification information (ID) for identifying the tag data 390 including the above-described various types of information. Therefore, for example, the ID 391 of the tag data 390 is generated.

At step S106, the tag registration unit 362 transmits the tag data 390 generated by the tag generation unit 361 as described above to the server 201 via the communication unit 314 and registers the same in the tag database 431.

At step S121, the tag acquisition unit 452 of the server 201 receives the tag data 390 transmitted from the telepresence device 110 via the communication unit 414.

At step S122, the tag management unit 451 registers the tag data 390 (that is, the tag 151) received at step S121 in the tag database 431 to manage.

Furthermore, at step S107, the tag icon output unit 363 allows (the display with touch panel 111 and the like of) the output unit 312 to display the tag icon of the tag 151 registered in the tag database 431 as described above.

By executing each such processing, the user may easily generate and register the tag 151 by a general user interface (UI) operation without requiring a dedicated tool and the like.

<Flow of Processing Regarding Output of Tag>

Figure 13:
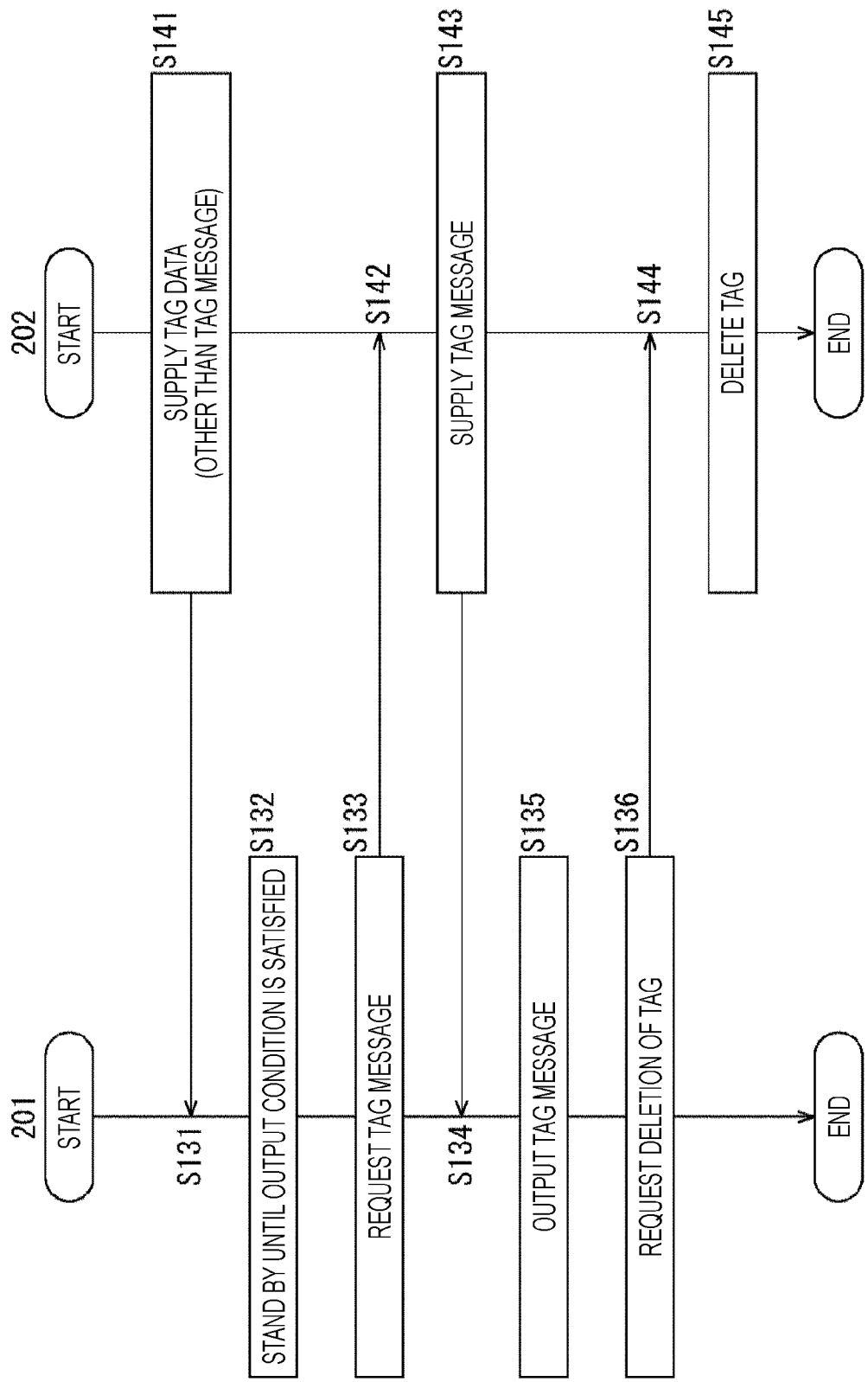
FIG. 13 is a flowchart for illustrating an example of a flow of event occurrence processing.

Next, an example of a flow of processing regarding control of the tag (occurrence of event and the like) of the self space attached by the communication partner is described with reference to a flowchart in FIG. 13.

When the processing is started, at step S141, the tag management unit 451 of the server 201 reads the tag 151 (tag data 390) attached to the space of the telepresence device 110 to be processed from the tag database 431. Then, the tag supply unit 453 transmits information other than the tag message 394 included in the read tag data 390 to the telepresence device 110 to be processed via the communication unit 414.

At step S131, the condition determination unit 371 of the telepresence device 110 receives the tag data 390 (other than the tag message 394) transmitted from the server 201 via the communication unit 314.

At step S132, the condition determination unit 371 refers to the tag message output condition 393 of the received tag data 390 and stands by until the output condition is satisfied. In a case where it is determined that the output condition is satisfied, the procedure shifts to next step.

At step S133, the condition determination unit 371 requests the tag message 394 of the tag data 390 from the server 201 via the communication unit 314.

At step S142, the tag management unit 451 receives the request via the communication unit 414. The tag management unit 451 reads the requested tag message 394 of the tag data 390 from the tag database 431 on the basis of the request, and transmits the tag message 394 to the telepresence device 110 as a request source via the communication unit 414.

At step S134, the tag message output unit 372 receives the tag message 394 transmitted from the server 201 via the communication unit 314.

At step S135, the tag message output unit 372 outputs the tag message via the output device (for example, the display with touch panel 111, the speaker 171 and the like) of the output unit 312.

At step S136, the tag deletion unit 373 requests deletion of the tag 151 that outputs the tag message from the server 201 via the communication unit 314.

At step S144, the tag deletion request acquisition unit 454 of the server 201 receives the deletion request via the communication unit 414.

At step S145, the tag management unit 451 deletes the tag data 390 of the tag 151 from the tag database 431 as requested.

By executing each such processing, it becomes possible to output the tag message on the basis of the occurrence condition. Therefore, more various communications may be implemented.

<Flow of Processing regarding Deletion of Tag>

Figure 14:
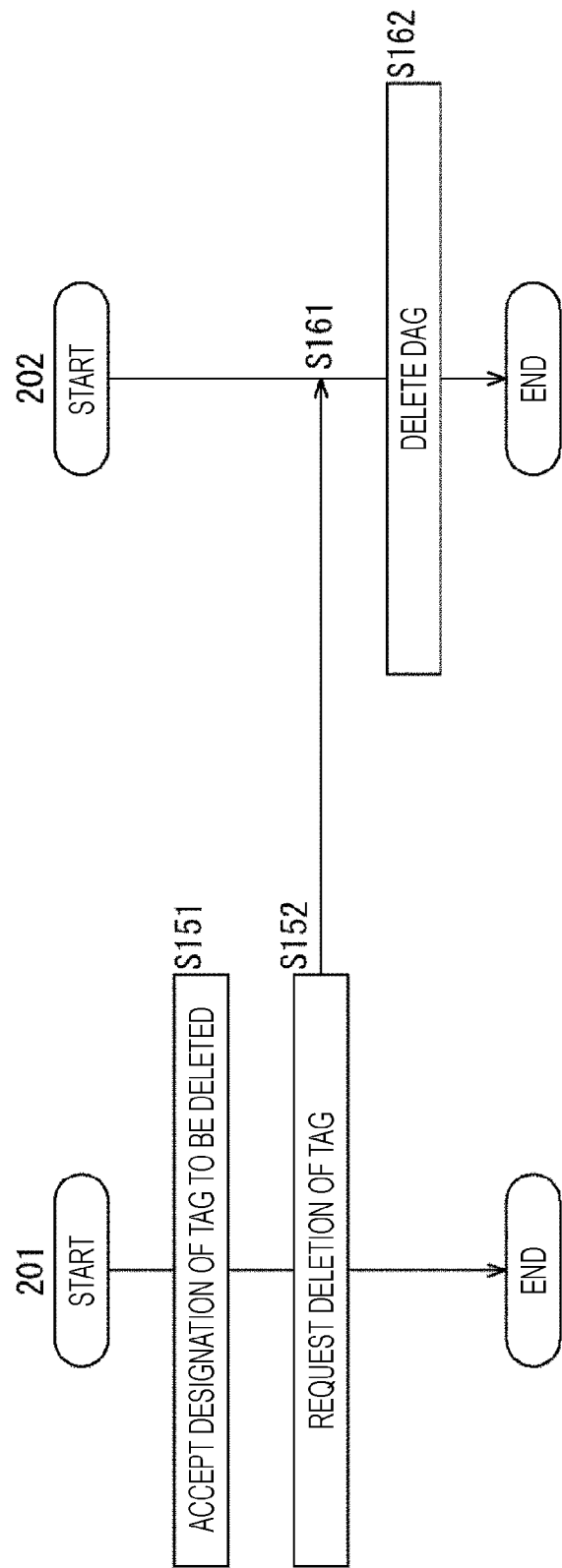
FIG. 14 is a flowchart for illustrating an example of a flow of tag deletion processing.

An example of a flow of processing regarding the deletion of the tag 151 is next described with reference to a flowchart in FIG. 14.

In a case of deleting the tag that is set once, the user 121 inputs an instruction to delete the tag 151, for example, by operating the display with touch panel 111 and the like. At step S151, the tag deletion unit 364 of the telepresence device 110 accepts designation of the tag 151 to be deleted (which tag 151 is to be deleted) via the input unit 311.

When the designation of the tag 151 to be deleted is accepted, at step S152, the tag deletion unit 364 requests deletion of the designated tag 151 from the server 201 via the communication unit 314.

At step S161, the tag deletion request acquisition unit 454 of the server 201 receives the request via the communication unit 414.

The tag management unit 451 deletes the tag 151 requested to be deleted from the tag database 431 on the basis of the request.

By executing each such processing, the user may easily delete the tag 151 by a general UI operation without requiring a dedicated tool and the like.

2. Second Embodiment

<Visualization of Tag of Self Space>
<Superimposing Display>

It is possible that a tag associated with a self space by a communication partner and the like is visually recognized (visualized). For example, a display with touch panel 111 may display an image of the self space to which the tag is attached in a translucent state so as to be superimposed on an image of a partner space.

Figure 15:
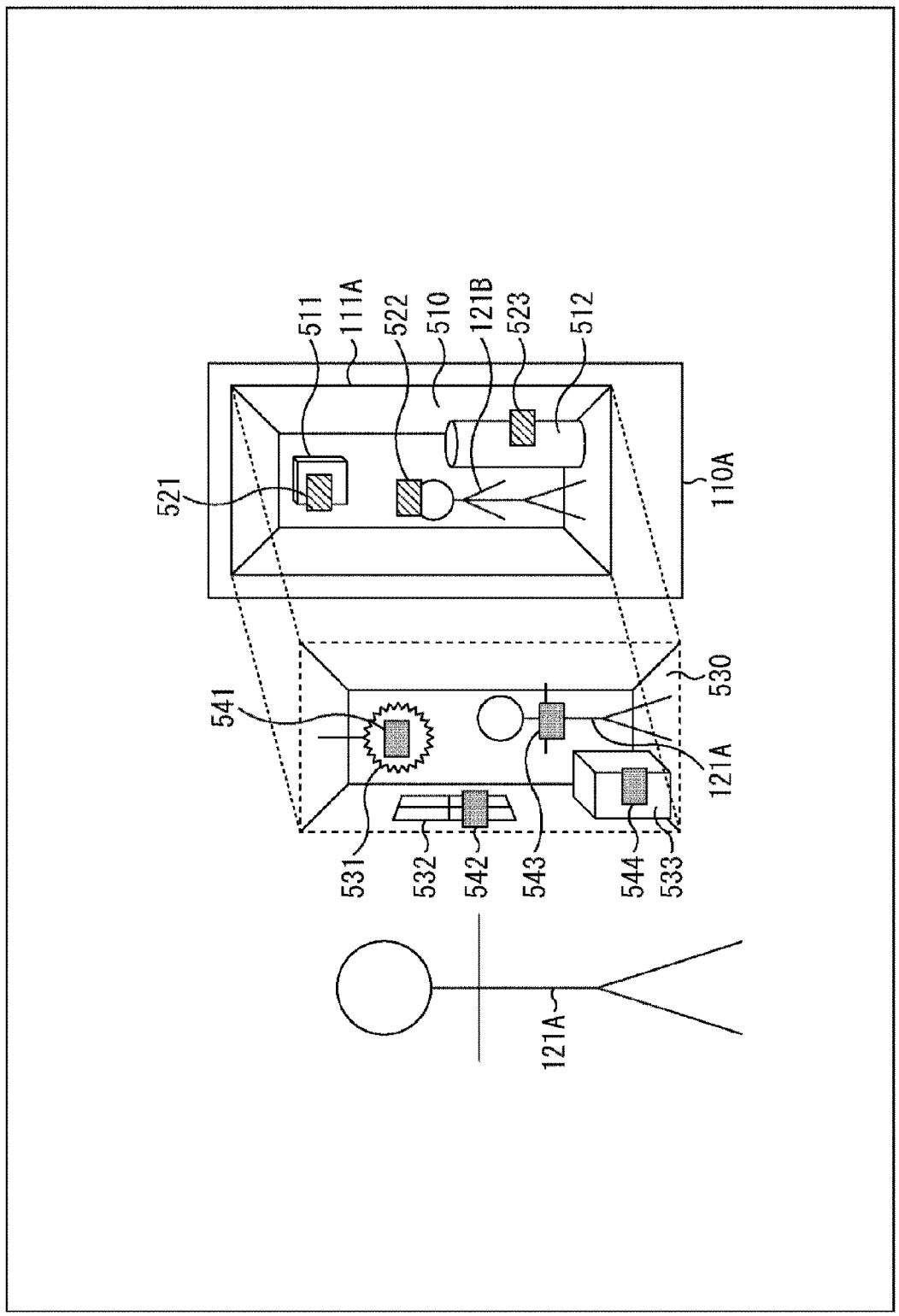
FIG. 15 is a diagram for illustrating a display example of the tag.

FIG. 15 is a diagram for illustrating a display example in this case. In FIG. 15, an image of a partner space 510 is displayed on a display with touch panel 111A. With this image, a user 121A may visually recognize that a tag 521 is attached to an object 511, a tag 522 is attached to a user 121B of the communication partner, and a tag 523 is attached to an object 512 in the partner space 510.

Furthermore, on the display with touch panel 111, an image of a self space 530 is displayed in a translucent state so as to be superimposed on the image of the partner space 520. With this image, the user 121A may visually recognize that a tag 541 is attached to an object 531, a tag 542 is attached to an object 532, a tag 543 is attached to the user 121A himself/herself, and a tag 544 is attached to an object 533 in the self space 530.

In this manner, by setting the image of the self space to the translucent state, it is possible to visually recognize the image of the self space while visually recognizing the image of the partner space. Furthermore, since the image of the self space and the image of the partner space may be displayed in a superimposed manner on one display, an increase in cost may be suppressed as compared with a case of using a plurality of displays. Furthermore, the image of the self space may be displayed in a larger size than in a case of displaying while dividing a display area.

Furthermore, at that time, the image of the self space may be obtained by combining the tag with a captured image, or may be obtained by horizontally inverting the captured image combined with the tag. By displaying the captured image in a horizontally inverting manner, the user 121 may visually recognize the image of the self space (the user 121 himself/herself or behind him/her) with a sense similar to that in a case of looking in a "mirror", and it is possible to suppress the sense of discomfort.

<Non-Superimposing Display>

It goes without saying that the image of the self space may be displayed so as not to be superimposed on the image of the partner space. For example, the image of the self space may be displayed on a display different from the display that displays the image of the partner space. Furthermore, the image of the self space and the image of the partner space may be displayed in different display areas of the display. Moreover, display of the display may be time-divided to alternately display the image of the self space and the image of the partner space.

<AR Display>

For example, it is possible to display the tag associated with the self space by the communication partner so as to be superimposed on an actual self space. For example, the tag associated with the self space by the communication partner may be displayed so as to be superimposed on an attachment target of the tag in the actual self space by using an augmented reality (AR) technology.

Figure 16:
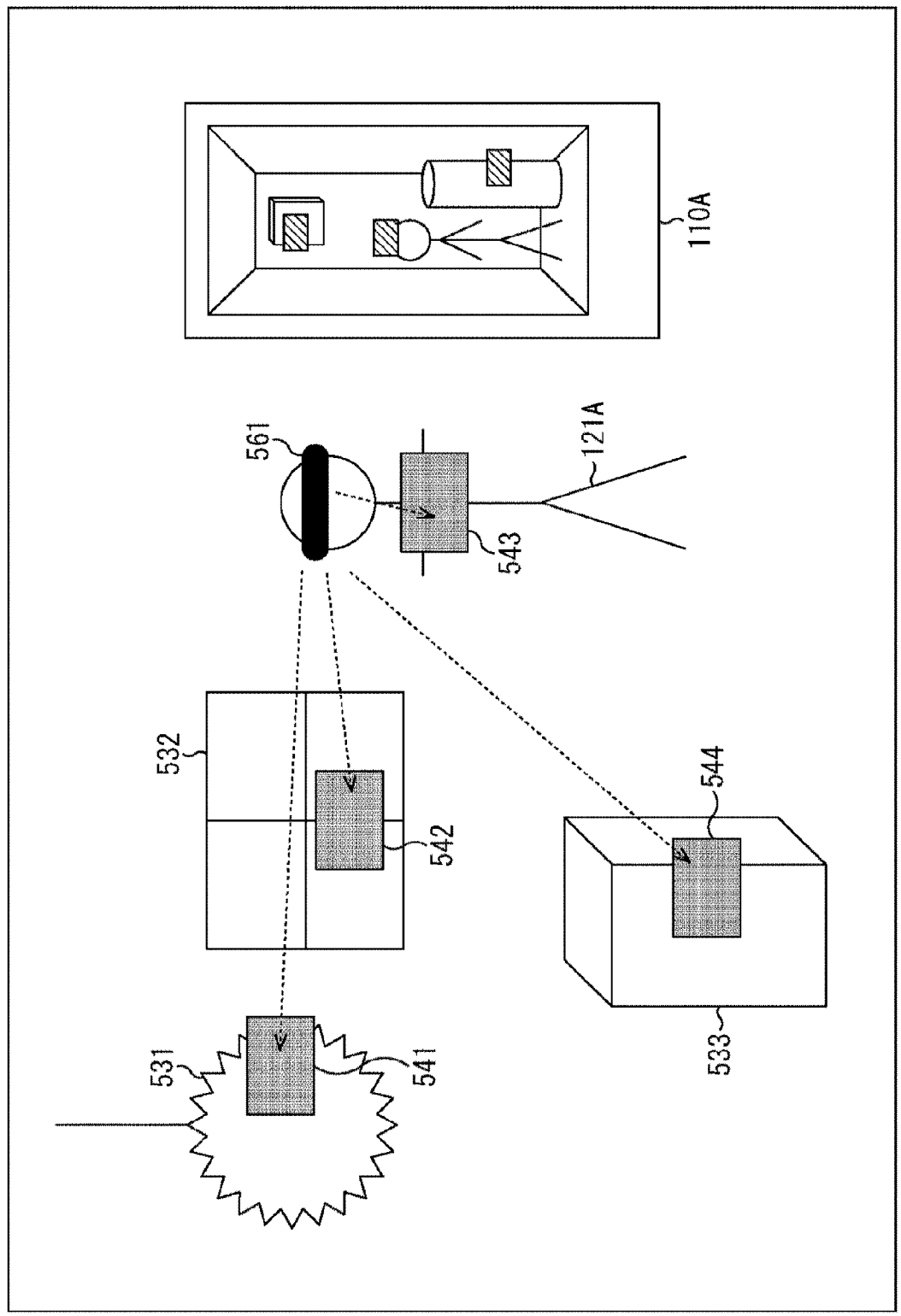
FIG. 16 is a diagram for illustrating the display example of the tag.

FIG. 16 is a diagram for illustrating a display example in this case. As illustrated in FIG. 16, in the self space, the tag 541 is attached to the object 531. Furthermore, the tag 542 is attached to the object 532. Moreover, the tag 543 is attached to the user 121A himself/herself. Furthermore, the tag 544 is attached to the object 533. In the self space, these tags are displayed using the AR technology and cannot be visually recognized without using the AR technology.

The user 121A wears AR glasses 561 compliant with the AR, and looks at the self space and the like via the AR glasses 561. The AR glasses 561 display the tag associated with the self space by the communication partner so as to be superimposed on the attachment target of the tag in the actual self space by using the AR technology. Therefore, the user 121A may visually recognize these tags (tags 541 to 544) attached to the self space via the AR glasses 561.

In this manner, the tag may be displayed only for the person wearing the AR glasses. By using this technology, for example, it is possible to control the user allowed to visually recognize the tag. That is, it is possible to display the tag only for a specific user, or limit the tag that may be visually recognized for each user. For example, the tag may be visualized only for the user as a destination of the tag.

Another Example of Telepresence Device

The specification of the telepresence device is any specification, and is not limited to the above-described example (the telepresence device 110). For example, this may be a telepresence device that shares a desktop area (working area) as illustrated in FIG. 17.

Figure 17:
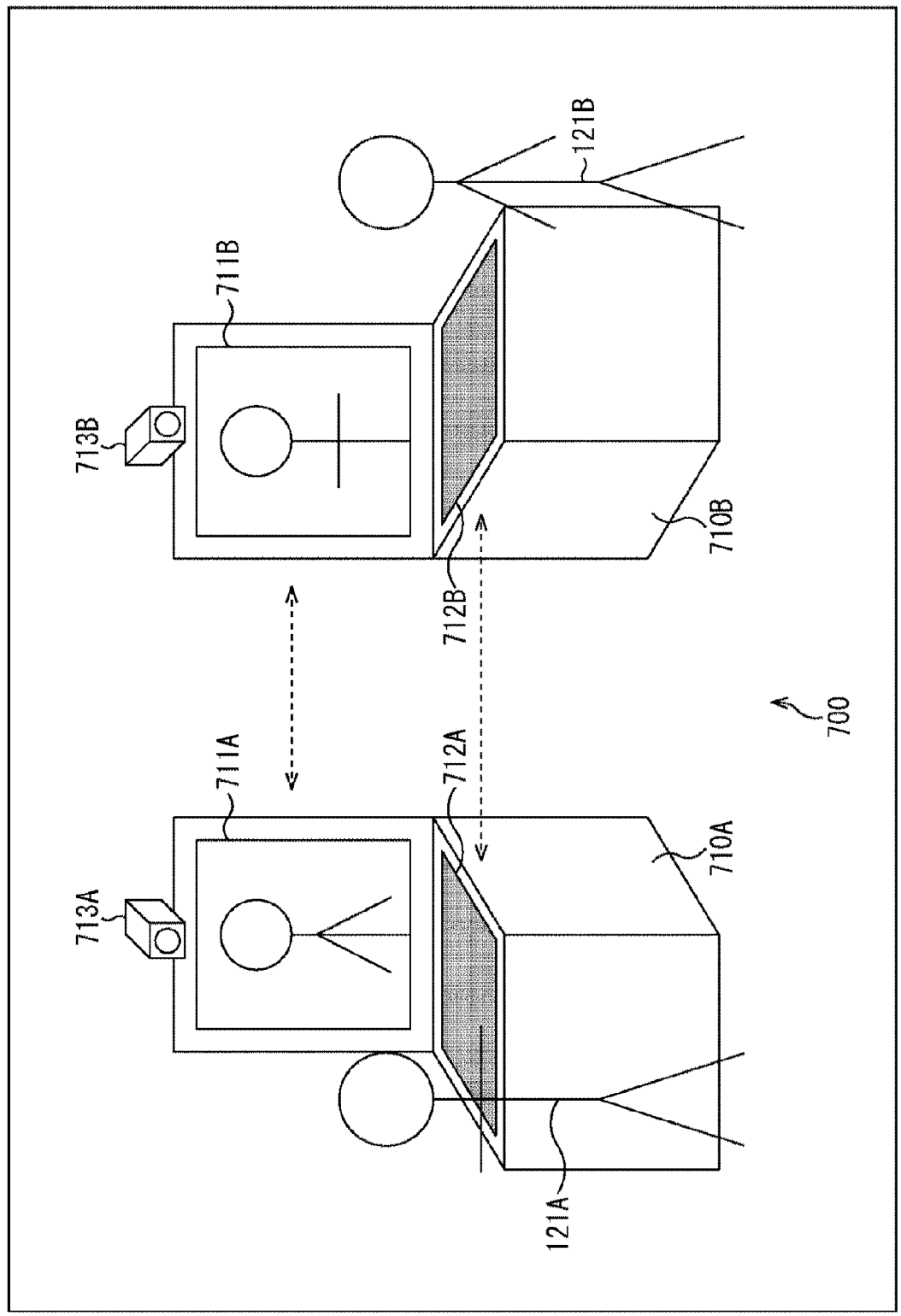
FIG. 17 is a diagram for illustrating another example of the telepresence system.

A telepresence device 710A illustrated in FIG. 17 is provided with a display 711A that displays an image of a partner space, a desktop area 712A shared with a communication partner, and a camera 713A that captures an image of a self space. Similarly, a telepresence device 710B is provided with a display 711B that displays an image of a partner space, a desktop area 712B shared with a communication partner, and a camera 713B that captures an image of a self space.

Hereinafter, in a case where it is not necessary to distinguish the telepresence device 710A and the telepresence device 710B from each other to describe, they are referred to as the telepresence device 710. Furthermore, in a case where it is not necessary to distinguish the display 711A and the display 711B from each other to describe, they are referred to as the display 711. Moreover, in a case where it is not necessary to distinguish the desktop area 712A and the desktop area 712B from each other to describe, they are referred to as the desktop area 712. Furthermore, in a case where it is not necessary to distinguish the camera 713A and the camera 713B from each other to describe, they are referred to as the camera 713.

The telepresence device 710A and the telepresence device 710B have a communication function similarly to the telepresence device 110, and may communicate with the communication partner. The display 711A displays the image of the partner space captured by the camera 713B. The display 711B displays the image of the partner space captured by the camera 713A.

Furthermore, the desktop area 712 may display an image and project an image. Furthermore, in the desktop area 712, an operation by the user 121 and the like is detected by various sensors. That is, the desktop area 712 is an area where input and output may be performed, and substantially serves as an input device and an output device.

Furthermore, information of the desktop area 712 is shared with the telepresence device 710 of the communication partner. That is, for example, a result of the input performed in the desktop area 712A is not only displayed in the desktop area 712A but also reflected in the desktop area 712B. The reverse is also true. Therefore, the user 121A and the user 121B may easily perform a cooperative work using the desktop area 712.

In the telepresence system 700 using such telepresence device 710 also, communication using the tag may be performed as is the case of the telepresence system 100 described above.

<Management of Tag by Telepresence Device>

In the above description, it is described that the tag is managed in the server 201, but the tag may be managed in the telepresence device. That is, the telepresence device may be provided with the tag database 431, and the telepresence device may implement the function of the tag management unit 451.

<3. Appendix>
<Application Target of Present Technology>

The present technology may be applied to any configuration.

For example, the present technology may be applied to various electronic devices such as a transmitter and a receiver (for example, a television receiver and a mobile phone) in satellite broadcasting, cable broadcasting such as cable TV, distribution on the Internet, and distribution to a terminal by cellular communication, or a device (for example, a hard disk recorder and a camera) that records an image on a medium such as an optical disk, a magnetic disk, and a flash memory, or reproduces an image from the storage medium.

Furthermore, for example, the present technology may also be implemented as a partial configuration of a device, such as a processor (for example, a video processor) as a system large scale integration (LSI) and the like, a module (for example, a video module) using a plurality of processors and the like, a unit (for example, a video unit) using a plurality of modules and the like, or a set (for example, a video set) obtained by further adding other functions to the unit.

Furthermore, for example, the present technology may also be applied to a network system including a plurality of devices. For example, the present technology may be implemented as cloud computing shared and processed in cooperation by a plurality of devices via a network. For example, the present technology may be implemented in a cloud service that provides a service regarding an image (moving image) to any terminal such as a computer, an audio visual (AV) device, a portable information processing terminal, or an Internet of Things (IoT) device.

Note that, in this specification, a system is intended to mean a set of a plurality of components (devices, modules (parts) and the like), and it does not matter whether all the components are in the same casing or not. Therefore, a plurality of devices accommodated in different casings and connected via a network and one device in which a plurality of modules is accommodated in one casing are the systems.

It is possible that the above-described series of processes is executed by hardware or executed by software. In a case where a series of processes is performed by the software, a program that forms the software is installed on a computer. Herein, the computer includes a computer built in dedicated hardware, a general-purpose personal computer, for example, capable of executing various functions by various programs installed and the like.

<Others>

The embodiments of the present technology are not limited to the above-described embodiments, and various modifications may be made without departing from the gist of the present technology.

For example, it is also possible to divide the configuration described as one device (or processing unit) into a plurality of devices (or processing units). Other way round, it is also possible to put the configurations described above as a plurality of devices (or processing units) together as one device (or processing unit). Furthermore, it goes without saying that it is possible to add a configuration other than the above-described one to the configuration of each device (or each processing unit). Moreover, it is also possible that a part of the configuration of a certain device (or processing unit) is included in the configuration of another device (or another processing unit) as long as a configuration and operation as an entire system are substantially the same.

Furthermore, for example, the above-described program may be executed in any device. In this case, it is only required that the device has necessary functions (functional blocks and the like) so that necessary information may be obtained.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step may be executed as processes of a plurality of steps. Other way round, the processes described as a plurality of steps may be collectively executed as one step.

Furthermore, for example, the program executed by the computer may be such that processes at steps of describing the program are executed in chronological order in the order described in this specification or that they are executed in parallel or individually executed at required timing such as when a call is issued. That is, as long as there is no inconsistency, the processes at respective steps may be executed in order different from the order described above. Moreover, the process at the step of describing the program may be executed in parallel with the process of another program, or may be executed in combination with the process of another program.

Furthermore, for example, as long as there is no inconsistency, each of a plurality of technologies regarding the present technology may be independently implemented as a single technology. It goes without saying that it is also possible to implement while combining a plurality of optional present technologies. For example, a part of or the entire present technology described in any embodiment may be implemented in combination with a part of or the entire present technology described in other embodiments. Furthermore, a part of or the entire optional present technology described above may be implemented in combination with other technologies not described above.

Note that, the present technology may also have following configurations.

(1) An information processing device provided with:
an input unit that accepts, in a space of a user, an input of information by the user; and
a generation unit that generates tag information for associating control information for controlling occurrence of an event for a communication partner of the user with a space of the communication partner using the information accepted by the input unit.

(2) The information processing device according to (1), in which
the input unit accepts designation of a target with which the tag information is associated, and
the generation unit generates the tag information associated with the target accepted by the input unit.

(3) The information processing device according to (2), in which
the target is a predetermined place in the space of the communication partner.

(4) The information processing device according to (2), in which
the target is a predetermined object in the space of the communication partner.

(5) The information processing device according to (2), in which
the input unit is provided with:
  a display that displays the space of the communication partner in the space of the user; and
  a touch panel that is superimposed on the display and detects a position touched by the user to designate the target in the space of the communication partner displayed on the display, and
the generation unit generates the tag information associated with the target in the space of the communication partner corresponding to the position touched by the user detected by the touch panel.

(6) The information processing device according to (5), in which
the input unit specifies a position in a depth direction in the space of the communication partner of the target designated by the user according to a length of a time during which the user touches the touch panel.

(7) The information processing device according to (1), in which
the input unit accepts designation of an occurrence condition of the event, and
the generation unit generates the tag information for associating the control information including the occurrence condition accepted by the input unit with the space of the communication partner.

(8) The information processing device according to (1), in which
the input unit accepts designation of the event, and
the generation unit generates the tag information for associating the control information including the designation of the event accepted by the input unit with the space of the communication partner.

(9) The information processing device according to (1), further provided with:
an imaging unit that captures an image of the space of the user and generates a captured image of the space of the user;
a display unit that displays a captured image of the space of the communication partner in the space of the user; and
a communication unit that supplies the captured image of the space of the user generated by the imaging unit and acquires the captured image in the space of the communication partner.

(10) An information processing method provided with:
accepting, in a space of a user, an input of information by the user; and
generating tag information for associating control information for controlling occurrence of an event for a communication partner of the user with a space of the communication partner using the accepted information.

(11) An information processing device provided with:
a determination unit that determines whether or not an occurrence condition of an event designated by tag information for associating control information for controlling occurrence of the event for a communication partner with a space of the communication partner, the tag information associated with a space of a user is satisfied; and
an event occurrence unit that allows, in a case where it is determined that the occurrence condition is satisfied by the determination unit, the event designated by the tag information to occur.

(12) The information processing device according to (11), in which
the occurrence condition is that the communication partner is located in the vicinity of a place associated with the tag, or that the communication partner touches an object associated with the tag.

(13) The information processing device according to (11), in which
the occurrence condition is a condition regarding an environment in the space of the communication partner.

(14) The information processing device according to (11), in which
the occurrence condition is a condition regarding time.

(15) The information processing device according to (11), in which
the event is display or a voice output of a message for the communication partner.

(16) The information processing device according to (11), further provided with:
an imaging unit that captures an image of the space of the user and generates a captured image of the space of the user;
a display unit that displays a captured image of the space of the communication partner in the space of the user; and
a communication unit that supplies the captured image of the space of the user generated by the imaging unit and acquires the captured image in the space of the communication partner.

(17) The information processing device according to (16), in which
the display unit further displays the tag information associated with the space of the user by the communication partner.

(18) The information processing device according to (17), in which the display unit displays the tag information associated with the space of the user so as to be superimposed on the captured image of the space of the communication partner.

(19) The information processing device according to (16), further provided with:

an augmented reality display unit that displays the tag information associated with the space of the user by the communication partner so as to be superimposed on the space of the user.

(20) An information processing method provided with:

determining whether or not an occurrence condition of an event designated by tag information for associating control information for controlling occurrence of the event for a communication partner with a space of the communication partner, the tag information associated with a space of a user is satisfied; and generating the event designated by the tag information in a case where it is determined that the occurrence condition is satisfied.

REFERENCE SIGNS LIST

100 Telepresence system
110 Telepresence device
111 Display with touch panel
112 Camera
121 User
130 Space
131 to 133 Object
140 Space
141 and 142 Object
151 Tag
161 to 163 Object
171 Speaker
201 Server
202 Network
351 Tag input processing unit
352 Tag output processing unit
361 Tag generation unit
362 Tag registration unit
363 Tag icon output unit
364 Tag deletion unit
371 Condition determination unit
372 Tag message output unit
373 Tag deletion unit
390 Tag data
391 ID
392 Tag attachment target
393 Tag message output condition
394 Tag message
395 Tag icon
431 Tag database
451 Tag management unit
452 Tag acquisition unit
453 Tag supply unit
454 Tag deletion request acquisition unit
510 Partner space
511 and 512 Object
521 to 523 Tag
530 Self space
531 to 533 Object
541 to 544 Tag
561 AR glasses
700 Telepresence system
710 Telepresence device
711 Display
712 Desktop area
713 Camera

The invention claimed is:

1. An information processing device comprising:
   an input unit configured to accept, in a space of a user, an input of information by the user; and
   a generation unit configured to generate tag information for associating control information for controlling occurrence of an event for a communication partner of the user with a space of the communication partner using the information accepted by the input unit.

2. The information processing device according to claim 1, wherein
   the input unit is further configured to accept designation of a target with which the tag information is associated, and
   the generation unit is further configured to generate the tag information associated with the target accepted by the input unit.

3. The information processing device according to claim 2, wherein
   the target is a predetermined place in the space of the communication partner.

4. The information processing device according to claim 2, wherein
   the target is a predetermined object in the space of the communication partner.

5. The information processing device according to claim 2, wherein
   the input unit is provided with:
      a display configured to display the space of the communication partner in the space of the user; and
      a touch panel that is superimposed on the display, wherein the touch panel is configured to detect a position touched by the user to designate the target in the space of the communication partner displayed on the display, and
   the generation unit is further configured to generate the tag information associated with the target in the space of the communication partner corresponding to the position touched by the user detected by the touch panel.

6. The information processing device according to claim 5, wherein
   the input unit is further configured to specify a position in a depth direction in the space of the communication partner of the target designated by the user according to a length of a time during which the user touches the touch panel.

7. The information processing device according to claim 1, wherein
   the input unit is further configured to accept designation of an occurrence condition of the event, and
   the generation unit is further configured to generate the tag information for associating the control information including the occurrence condition accepted by the input unit with the space of the communication partner.

8. The information processing device according to claim 1, wherein
   the input unit is further configured to accept designation of the event, and
   the generation unit is further configured to generate the tag information for associating the control information including the designation of the event accepted by the input unit with the space of the communication partner.

9. The information processing device according to claim 1, further comprising:
an imaging unit configured to capture an image of the space of the user and generate a captured image of the space of the user;
a display unit configured to display a captured image of the space of the communication partner in the space of the user; and
a communication unit configured to supply the captured image of the space of the user generated by the imaging unit and acquire the captured image in the space of the communication partner.

10. An information processing method, comprising:
accepting, in a space of a user, an input of information by the user; and
generating tag information for associating control information for controlling occurrence of an event for a communication partner of the user with a space of the communication partner using the accepted information.

11. An information processing device, comprising:
a determination unit configured to determine whether an occurrence condition of an event designated by tag information for associating control information for controlling occurrence of the event for a communication partner with a space of the communication partner, the tag information associated with a space of a user is satisfied; and
an event occurrence unit configured to allow, in a case where it is determined that the occurrence condition is satisfied by the determination unit, the event designated by the tag information to occur.

12. The information processing device according to claim 11, wherein
the occurrence condition is that the communication partner is located in a vicinity of a place associated with the tag information, or that the communication partner touches an object associated with the tag information.

13. The information processing device according to claim 11, wherein
the occurrence condition is a condition regarding an environment in the space of the communication partner.

14. The information processing device according to claim 11, wherein
the occurrence condition is a condition regarding time.

15. The information processing device according to claim 11, wherein
the event is display or a voice output of a message for the communication partner.

16. The information processing device according to claim 11, further comprising:
an imaging unit configured to capture an image of the space of the user and generate a captured image of the space of the user;
a display unit configured to display a captured image of the space of the communication partner in the space of the user; and
a communication unit configured to supply the captured image of the space of the user generated by the imaging unit and acquire the captured image in the space of the communication partner.

17. The information processing device according to claim 16, wherein
the display unit is further configured to display the tag information associated with the space of the user by the communication partner.

18. The information processing device according to claim 17, wherein
the display unit is further configured to display the tag information associated with the space of the user so as to be superimposed on the captured image of the space of the communication partner.

19. The information processing device according to claim 16, further comprising
an augmented reality display unit configured to display the tag information associated with the space of the user by the communication partner so as to be superimposed on the space of the user.

20. An information processing method, comprising:
determining whether an occurrence condition of an event designated by tag information for associating control information for controlling occurrence of the event for a communication partner with a space of the communication partner, the tag information associated with a space of a user is satisfied; and
generating the event designated by the tag information in a case where it is determined that the occurrence condition is satisfied.

* * * * *